United States Patent
Miyamoto

(10) Patent No.: US 11,798,227 B2
(45) Date of Patent: Oct. 24, 2023

(54) IMAGE PROCESSING APPARATUS AND IMAGE PROCESSING METHOD

(71) Applicant: SONY GROUP CORPORATION, Tokyo (JP)

(72) Inventor: Kohei Miyamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 95 days.

(21) Appl. No.: 17/435,413

(22) PCT Filed: Jan. 30, 2020

(86) PCT No.: PCT/JP2020/003361
§ 371 (c)(1),
(2) Date: Sep. 1, 2021

(87) PCT Pub. No.: WO2020/183961
PCT Pub. Date: Sep. 17, 2020

(65) Prior Publication Data
US 2022/0180597 A1 Jun. 9, 2022

(30) Foreign Application Priority Data
Mar. 12, 2019 (JP) ................................ 2019-044457

(51) Int. Cl.
*G06T 11/00* (2006.01)
*G06T 17/00* (2006.01)
(Continued)

(52) U.S. Cl.
CPC ............... *G06T 17/00* (2013.01); *G06T 7/40* (2013.01); *G06T 7/90* (2017.01); *G06T 15/04* (2013.01);
(Continued)

(58) Field of Classification Search
CPC . G06T 11/001; G06T 7/90; G06T 7/40; G06T 15/04; G06T 17/00; G06T 2200/08;
(Continued)

(56) References Cited

U.S. PATENT DOCUMENTS 5,949,409 A * 9/1999 Tanaka ................. G06T 11/001
345/549
6,424,351 B1 * 7/2002 Bishop .................... G06T 15/04
345/582
(Continued)

FOREIGN PATENT DOCUMENTS

CN 108876886 A * 5/2017 ............. G06T 15/04
EP 2581881 A1 4/2013
(Continued)

OTHER PUBLICATIONS

International Search Report and Written Opinion of PCT Application No. PCT/JP2020/003361, dated Mar. 17, 2020, 08 pages of ISRWO.

*Primary Examiner* — Wesner Sajous
(74) *Attorney, Agent, or Firm* — CHIP LAW GROUP

(57) ABSTRACT

An apparatus and a method are provided that are used to generate a three-dimensional model in which a more natural texture is set for an occlusion region of which a texture is not obtained from a two-dimensional image. A three-dimensional shape restoring section that generates a three-dimensional model on the basis of a two-dimensional image, and a texture processor that attaches a texture to the three-dimensional model are included. The texture processor acquires, from a DB, an existing texture similar to a texture acquired from the two-dimensional image, calculates a conversion function that is used so that the existing texture has a color closer to the color of the acquired texture, and sets, for a region of which a texture is not acquired from the (Continued)

two-dimensional image, a texture calculated by applying the conversion function to the existing texture.

7 Claims, 12 Drawing Sheets

(51) Int. Cl.
    *G06T 7/90*         (2017.01)
    *G06T 7/40*         (2017.01)
    *G06T 15/04*       (2011.01)
    *G06V 20/64*      (2022.01)
    *G09G 5/02*         (2006.01)
    *H04N 1/60*         (2006.01)

(52) U.S. Cl.
    CPC ........ *G06V 20/647* (2022.01); *G06T 2200/08* (2013.01); *G06T 2207/10024* (2013.01); *G06T 2207/20092* (2013.01)

(58) Field of Classification Search
    CPC ........... G06T 2207/20092; G06T 15/00; G06T 15/20; G06T 19/00; G06T 11/40; G06T 7/00; G06T 5/001; G06T 5/006; G06T 1/0007; G06T 1/60; H04N 1/60; H04N 5/202; H04N 9/44; H04N 9/77; H04N 1/6033; H04N 1/6041; G06V 20/647; G09G 5/02; G09G 5/39; G09G 5/30; G09G 2320/0223; G09G 2320/0242
    See application file for complete search history.

(56) References Cited

U.S. PATENT DOCUMENTS

| | | | |
|---|---|---|---|
| 11,113,831 B2* | 9/2021 | Grunnet-Jepsen | ... H04N 13/271 |
| 2010/0328307 A1 | 12/2010 | Lim | |
| 2013/0120425 A1 | 5/2013 | Kuwabara et al. | |
| 2014/0241624 A1* | 8/2014 | Gurbuz | .................. G06T 7/194 |
| | | | 382/164 |

FOREIGN PATENT DOCUMENTS

| | | | | | |
|---|---|---|---|---|---|
| JP | 2006-163852 A | 6/2006 | | | |
| JP | 2016-048467 A | 4/2016 | | | |
| JP | 2017-138913 A | 8/2017 | | | |
| JP | 2017138913 A | * | 8/2017 | ........... | A63F 13/655 |
| KR | 10-2010-0138648 A | 12/2010 | | | |
| WO | 2011/155068 A1 | 12/2011 | | | |

* cited by examiner

US 11,798,227 B2

IMAGE PROCESSING APPARATUS AND IMAGE PROCESSING METHOD

CROSS REFERENCE TO RELATED APPLICATIONS

This application is a U.S. National Phase of International Patent Application No. PCT/JP2020/003361 filed on Jan. 30, 2020, which claims priority benefit of Japanese Patent Application No. JP 2019-044457 filed in the Japan Patent Office on Mar. 12, 2019. Each of the above-referenced applications is hereby incorporated herein by reference in its entirety.

TECHNICAL FIELD

The present disclosure relates to an image processing apparatus, an image processing method, and a program. In particular, the present disclosure relates to an image processing apparatus, an image processing system, and a program that perform processing of generating a three-dimensional (3D) model and processing of rendering a three-dimensional image.

BACKGROUND ART

In recent years, a three-dimensional image generating technology using a computer graphics (CG) technology has been used in various fields such as fields of movie and a game.

For example, Patent Literature 1 (Japanese Patent Application Laid-Open No. 2017-138913) discloses processing of replacing a CG character in an image with a character having a face of a user who is a player.

Patent Literature 1 discloses a technology that captures an image of a face of a user, converts an RGB value of a skin-colored region in the captured image of the face into an HSV (hue, saturation, brightness) value to perform analysis, and reflects information regarding the skin color of the user in a skin color of, for example, a face, an arm, and a foot of a replacement-target CG character, the information being obtained as a result of the analysis.

However, the apparatus disclosed in Patent Literature 1 does not adjust a color of a conversion-target skin in consideration of, for example, a texture of the skin, the resolution of a replacement-source image, and noise in the replacement-source image. This results in a feeling of strangeness being left in an image obtained by combining.

Further, for example, there is existing software used to perform processing of restoring a three-dimensional shape and a texture of an entire face from a single RGB image of the face. However, it is often the case that, for example, such existing software calculates an average color of a region expected to be a skin of a face, performs a color correction so that a single piece of high-resolution UV texture data prepared in advance has a color closer to the calculated average color, and performs combining.

As in the case of the configuration disclosed in Patent Literature 1 described above, this method does not adjust a color of a skin in consideration of, for example, a texture of the skin and an attribute of a subject. This also results in a feeling of strangeness being left in an image obtained by combining.

CITATION LIST

Patent Literature

Patent Literature 1: Japanese Patent Application Laid-open No. 2017-138913

DISCLOSURE OF INVENTION

Technical Problem

The present disclosure has been made in view of, for example, the problems described above, and provides an image processing apparatus, an image processing method, and a program that perform processing of generating a more natural and realistic three-dimensional (3D) model, that is, processing of rendering a three-dimensional image.

A configuration of an embodiment of the present disclosure provides an image processing apparatus, an image processing method, and a program that are used to generate, for example, a three-dimensional model (a three-dimensional image) on the basis of a two-dimensional image, and can generate a three-dimensional image that has a more natural and realistic color and texture even with respect to a hidden region (an occlusion region) that is not included in the two-dimensional image.

Solution to Problem

A first aspect of the present disclosure is an image processing apparatus that includes a three-dimensional shape restoring section to which a two-dimensional image is input, the three-dimensional shape restoring section generating a three-dimensional model corresponding to the input image; and a texture processor that attaches a texture to the three-dimensional model generated by the three-dimensional shape restoring section, the texture processor performing processing of acquiring, from a texture database, an existing texture that is similar to an acquired texture acquired from the two-dimensional image, processing of calculating a conversion function that is used so that the existing texture has a color closer to a color of the acquired texture, and processing of setting, for a texture unsetting region in the three-dimensional model, a texture calculated by applying the conversion function to the existing texture, the texture unsetting region being a region of which a texture is not obtained from the two-dimensional image.

Further, a second aspect of the present disclosure is an image processing method that is performed by an image processing apparatus, the image processing method including performing three-dimensional shape restoring processing that includes inputting a two-dimensional image to a three-dimensional shape restoring section, and generating, by the three-dimensional shape restoring section, a three-dimensional model corresponding to the input image; and attaching, by a texture processor, a texture to the three-dimensional model generated by the three-dimensional shape restoring section, the attaching the texture to the three-dimensional model including performing processing of acquiring, from a texture database, an existing texture that is similar to an acquired texture acquired from the two-dimensional image, processing of calculating a conversion function that is used so that the existing texture has a color closer to a color of the acquired texture, and processing of setting, for a texture unsetting region in the three-dimensional model, a texture calculated by applying the conversion function to the existing texture, the texture unsetting region being a region of which a texture is not obtained from the two-dimensional image.

Furthermore, a third aspect of the present disclosure is a program that causes an image processing apparatus to perform image processing including performing three-dimensional shape restoring processing that includes inputting a two-dimensional image to a three-dimensional shape restoring section, and the three-dimensional shape restoring section generating a three-dimensional model corresponding to the input image; and a texture processor attaching a texture to the three-dimensional model generated by the three-dimensional shape restoring section, the attaching the texture to the three-dimensional model including performing processing of acquiring, from a texture database, an existing texture that is similar to an acquired texture acquired from the two-dimensional image, processing of calculating a conversion function that is used so that the existing texture has a color closer to a color of the acquired texture, and processing of setting, for a texture unsetting region in the three-dimensional model, a texture calculated by applying the conversion function to the existing texture, the texture unsetting region being a region of which a texture is not obtained from the two-dimensional image.

Note that the program of the present disclosure is, for example, a program that can be provided by a storage medium or a communication medium to an image processing apparatus or a computer system that is capable of executing various program codes, the storage medium or the communication medium providing a program in a computer-readable form. Due to such a program being provided in a computer-readable form, a process depending on the program is performed in an image processing apparatus or a computer system.

Other objects, features, and advantages of the present disclosure will be apparent from a more detailed description based on embodiments of the present disclosure described later and the accompanying drawings. Note that a system herein is a logical collection of a plurality of apparatuses, and is not limited to having a configuration in which respective included apparatuses are situated in a single housing.

A configuration of an embodiment of the present disclosure provides an apparatus and a method that are used to generate a three-dimensional model in which a more natural texture is set for an occlusion region of which a texture is not obtained from a two-dimensional image.

Specifically, for example, a three-dimensional shape restoring section that generates a three-dimensional model on the basis of a two-dimensional image, and a texture processor that attaches a texture to the three-dimensional model are included. The texture processor acquires, from a DB, an existing texture similar to a texture acquired from the two-dimensional image, calculates a conversion function that is used so that the existing texture has a color closer to the color of the acquired texture, and sets, for a region of which a texture is not acquired from the two-dimensional image, a texture calculated by applying the conversion function to the existing texture. For example, a texture calculated by applying the conversion function is set for an occlusion region of which a texture is not obtained from a two-dimensional image.

This configuration provides an apparatus and a method that are used to generate a three-dimensional model in which a more natural texture is set for an occlusion region of which a texture is not obtained from a two-dimensional image.

Note that the effects described herein are not limitative but are merely illustrative, and additional effects may be provided.

MODE(S) FOR CARRYING OUT THE INVENTION

Figure 1:
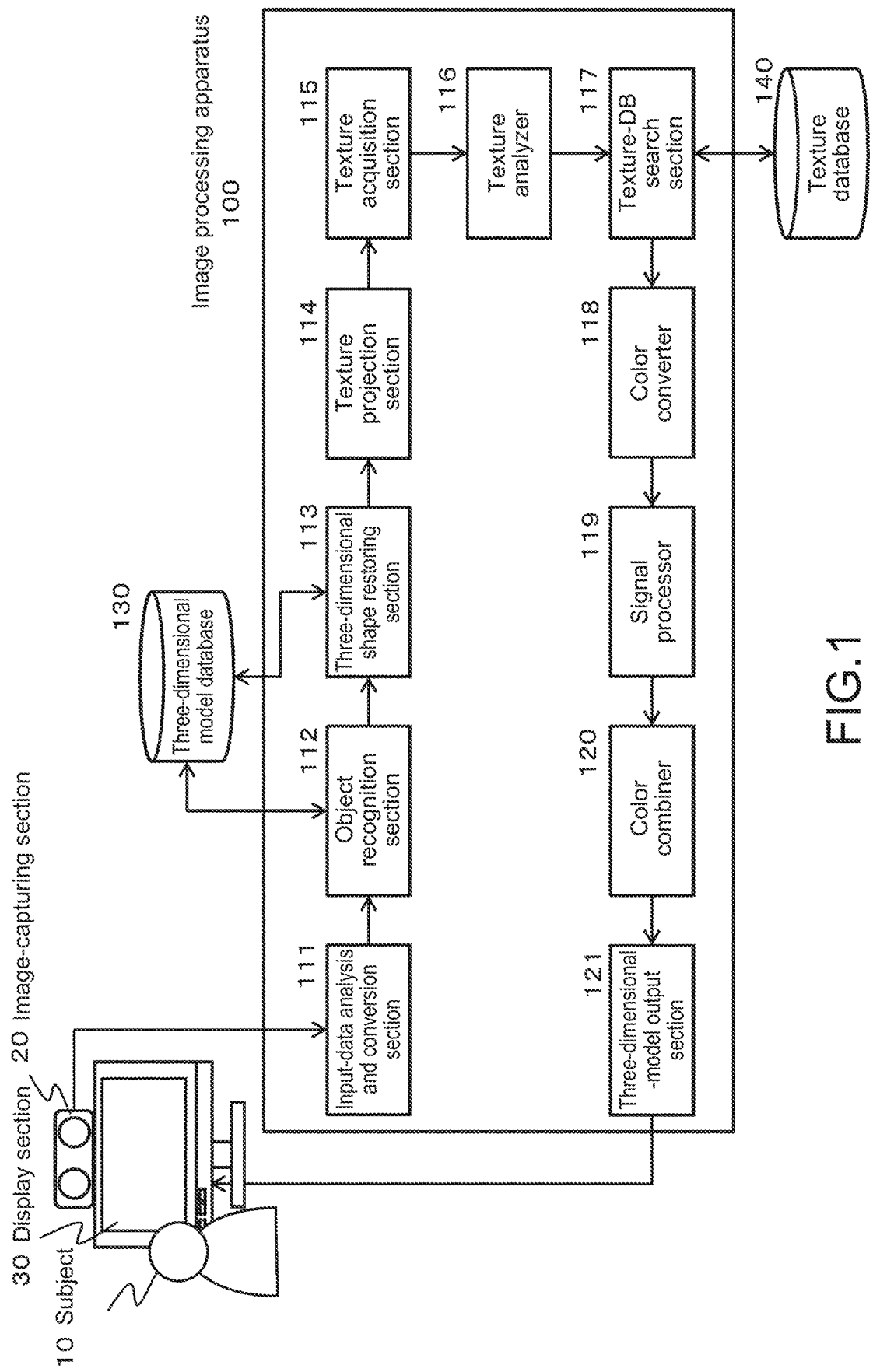
FIG. 1 illustrates an example of a configuration of an image processing apparatus of the present disclosure.

An image processing apparatus, an image processing method, and a program will now be described in detail with reference to the drawings. Note that the description is made as indicated below.

1. Outline of Processing Performed by Image Processing Apparatus of Present Disclosure 2. Configuration of Image Processing Apparatus of Present Disclosure and Details of Processing Performed by Image Processing Apparatus of Present Disclosure 3. Sequence of Processing Performed by Image Processing Apparatus of Present Disclosure 4. Example of Hardware Configuration of Image Processing Apparatus 5. Summary of Configuration of Present Disclosure

[1. Outline of Processing Performed by Image Processing Apparatus of Present Disclosure]

An image processing apparatus of the present disclosure performs processing of generating a more natural and realistic three-dimensional (3D) model, that is, the image processing apparatus generates a three-dimensional image.

For example, when a three-dimensional model (a three-dimensional image) is generated on the basis of a single two-dimensional image, there is a need to perform processing with respect to a hidden region (an occlusion region) that is not included in the two-dimensional image.

It is difficult to directly observe, for example, a shape, a color, and a pattern of the hidden region (the occlusion region) that is not included in the two-dimensional image. Thus, there is a need to infer them using some method.

In other words, there is a need to perform processing that includes predicting a "three-dimensional shape" with respect to the occlusion region, and a "texture" that is an image pasted on a "mesh" that is division regions of a three-dimensional model, and generating a three-dimensional model.

For example, when a three-dimensional model is generated from a two-dimensional image of the left half of a face, a "three-dimensional shape" and a "texture" of the left half of the face can be directly acquired from the original two-dimensional image. However, information regarding a region that corresponds to the right half of the face and is not included in the two-dimensional image, is not obtained. Thus, there is a need to predict and restore a "three-dimensional shape" and a "texture" of the right half of the face using some method.

The image processing apparatus of the present disclosure uses, for example, an existing three-dimensional model (a prior model) upon performing such processing of restoring a three-dimensional shape of a hidden region (an occlusion region) that is not included in a two-dimensional image.

For example, when a three-dimensional model of a human face is generated from a two-dimensional image of the face, an existing three-dimensional model that has a feature similar to the feature of the two-dimensional image is selected from three-dimensional models (existing models (prior models)) of various faces that are stored in a database in advance, and the selected existing three-dimensional model is deformed to restore a three-dimensional shape of an occlusion region that is not included in the two-dimensional image.

Further, a fill-hole technology may be used upon performing processing of restoring a three-dimensional shape of an occlusion region.

The fill-hole technology is a technology used to fill in a three-dimensional shape of a mesh for which information is missing, on the basis of information regarding a mesh situated around the mesh for which information is missing.

Further, in processing of restoring a texture of an occlusion region, a piece of existing texture data that has a feature similar to the feature of a two-dimensional image is selected from various pieces of texture data stored in a database in advance (pieces of existing texture data), and the selected piece of existing texture data is used, as in the case of the processing of restoring a three-dimensional shape described above.

Note that, when the existing texture data is used, a feature (such as a color and a texture) of an original two-dimensional image is analyzed, and correction processing is performed so that the existing texture data has a feature (such as a color and a texture) closer to the feature of the two-dimensional image.

Further, a method that uses an inpainting technology that is a technology used to restore an image by image embedding, may be applied.

Note that processing of restoring both a three-dimensional model (an existing model (a prior model)) and texture information may be performed using a three-dimensional model (an existing model (a prior model)) including various types of pieces of texture data as a three-dimensional model (an existing model (a prior model)) used in the processing of restoring a three-dimensional shape described above.

When the image processing apparatus of the present disclosure performs processing of generating a three-dimensional model from a two-dimensional image, the image processing apparatus performs, for example, the following processing as processing of restoring a texture of a hidden region (an occlusion region) that is not included in the two-dimensional image.

(a) A certain texture is extracted from an input two-dimensional image or a texture map generated on the basis of the two-dimensional image, and a texture map (a UV texture map) that corresponds to a three-dimensional model and includes an existing texture similar to the extracted certain texture is selected from a texture database.

(b) Next, a color conversion, and signal processing such as noise addition processing and resolution conversion processing are performed on the selected texture map (UV texture map) corresponding to a three-dimensional model, and the existing texture of the selected texture map is set to be a texture of a hidden region (an occlusion region) that is not included in the two-dimensional image.

A configuration of the image processing apparatus of the present disclosure that performs the processing described above, and details of the processing are described below.

[2. Configuration of Image Processing Apparatus of Present Disclosure and Details of Processing Performed by Image Processing Apparatus of Present Disclosure]

The configuration of the image processing apparatus of the present disclosure, and the details of the processing performed by the image processing apparatus of the present disclosure are described below with reference to the drawings.

FIG. 1 is a block diagram illustrating a configuration of an image processing apparatus 100 of the present disclosure.

The configuration of the image processing apparatus 100 of the present disclosure, and processing performed by the image processing apparatus 100 are described below using the block diagram illustrated in FIG. 1. As described above, the image processing apparatus 100 of the present disclosure performs processing that includes generating a three-dimensional model using various three-dimensional models (existing three-dimensional models (prior models)) stored in a database in advance, rendering a three-dimensional image, and displaying the three-dimensional image on a display section.

The database stores therein various existing three-dimensional models of, for example, a human face, a human body, an animal, a plant, a structure, and a building. The image processing apparatus 100 of the present disclosure can generate new three-dimensional models of various objects by referring to these existing three-dimensional models stored in the database.

An example in which processing of generating a three-dimensional model of a human face is performed is described below in order to facilitate understanding of the description.

An image-capturing section 20 illustrated in FIG. 1 captures an image (a two-dimensional image) and a range image (a depth image) of a face of a subject 10. The subject 10 is a subject for which a three-dimensional model is to be generated. Here, the subject 10 is a human face.

The image-capturing section 20 captures at least one color image such as an RGB image, and at least one range image (depth image), and inputs the captured image to the image processing apparatus 100.

An input-data analysis and conversion section 111 of the image processing apparatus 100 analyzes image data input by the image-capturing section 20, and performs conversion on the image data. For example, when an RGB color image is input, the input-data analysis and conversion section 111 converts the input image into, for example, bitmap data. Further, when a range image (a depth image) is input, the input-data analysis and conversion section 111 performs, for example, processing of converting the input image into 16-bit tiff data.

Note that data may be converted into any format in which data can be processed by each subsequent processor, and the processable data format differs depending on the configuration of the subsequent processor.

Conversion data (such as an RGB image and a depth image) generated by the input-data analysis and conversion section 111 is input to an object recognition section 112.

The object recognition section 112 analyzes the RGB image and the depth image to determine an object type of a subject (object), and determines whether an existing three-dimensional model (a prior model) that corresponds to the determined object type is included in a three-dimensional model database 130.

The three-dimensional model database 130 may be a database in the image processing apparatus 100, or a database that can be accessed via, for example, the Internet may be used as the three-dimensional model database 130.

Note that, when the type of a subject is known, the determination of an object type that is performed by the object recognition section 112 can be omitted.

Various existing methods such as pattern matching can be applied as a method of an object recognition performed by the object recognition section 112.

A result of determining an object type that is a result of the object recognition performed by the object recognition section 112, such as "recognized type of object=human face", is input to a three-dimensional shape restoring section 113 together with conversion data (such as an RGB image and a depth image) generated by the conversion section 111.

On the basis of the result of the object recognition performed by the object recognition section 112, the three-dimensional shape restoring section 113 selects and acquires, from the three-dimensional model database 130, an existing three-dimensional model (a prior model) that matches the recognized type of object.

For example, "recognized type of object=human face" in this example. Thus, the three-dimensional shape restoring section 113 selects and acquires an existing three-dimensional model (a prior model) of a human face from the three-dimensional model database 130.

Using the existing three-dimensional model (prior model) of a human face that has been acquired from the three-dimensional model database 130, the three-dimensional shape restoring section 113 deforms the acquired existing three-dimensional model to perform processing of correcting for a three-dimensional shape so that the existing three-dimensional model is closer to input data (an RGB image and a depth image), and generates a new three-dimensional model corresponding to the subject 10 of which an image is captured by the image-capturing section 20.

For example, when input data is an RGB image and a depth image, the three-dimensional shape restoring section 113 first generates a point cloud obtained by representing data acquired from the depth image in the form of point cloud data on three-dimensional coordinates.

Further, alignment of the generated point cloud with the existing three-dimensional model (prior model) of a human face that has been acquired from the three-dimensional model database 130, is performed, and corresponding vertices are associated with each other. For example, processing of pairing points situated close to each other as corresponding points, is performed.

Thereafter, an existing three-dimensional model (a prior model) is deformed such that an error between corresponding points is reduced with respect to all of the pairs of corresponding points.

This processing makes it possible to generate a new three-dimensional model that corresponds to the subject 10 and of which a three-dimensional shape has been restored, the three-dimensional shape including a three-dimensional shape of a hidden region (an occlusion region) that is not included in a two-dimensional image captured by the image-capturing section 20.

A specific example of the processing performed by the three-dimensional shape restoring section 113 is described with reference to FIGS. 2 and 3.

Figure 2:
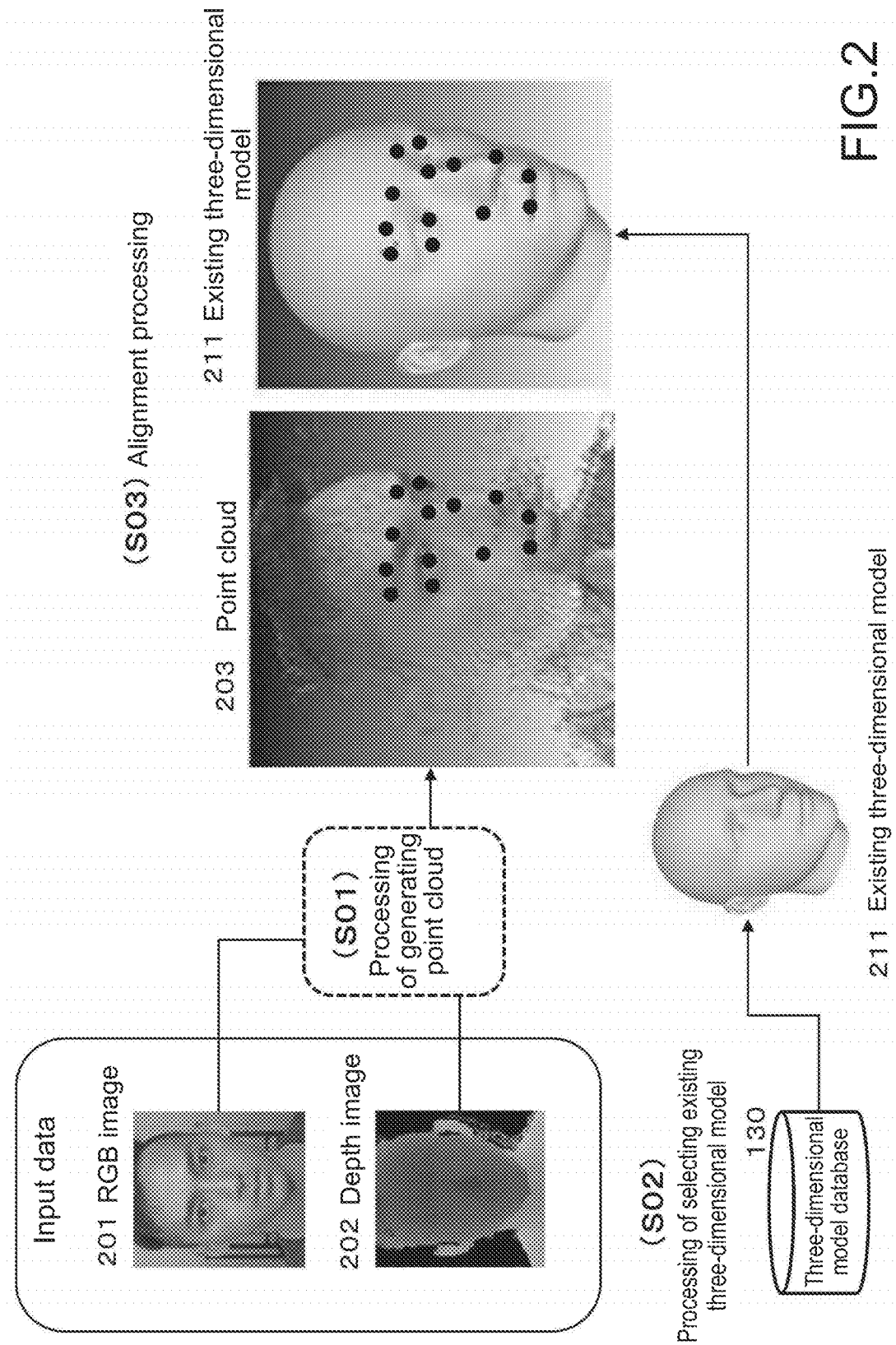
FIG. 2 is a diagram describing processing performed by a three-dimensional shape restoring section.

As illustrated in FIG. 2, the three-dimensional shape restoring section 113 inputs an RGB image 201 and a depth image 202 that are captured images of the subject 10.

Note that the RGB image 201 is a color image.

First, in Step S01, the three-dimensional shape restoring section 113 generates a point cloud 203 obtained by representing data acquired from the depth image 202 in the form of point cloud data on three-dimensional coordinates.

Next, in Step S02, the three-dimensional shape restoring section 113 selects and acquires, from the three-dimensional model database 130, an existing three-dimensional model (a prior model) that matches a type of an object identified by the object recognition section 112. An existing three-dimensional model (a prior model) 211 of a human face illustrated in FIG. 2 is selected.

Next, in Step S03, the three-dimensional shape restoring section 113 performs alignment of the point cloud 203 generated in Step S01 with the existing three-dimensional model (prior model) 211 of a human face that has been acquired from the three-dimensional model database 130, and associates corresponding vertices. For example, the three-dimensional shape restoring section 113 performs processing of pairing points situated close to each other as corresponding points.

Figure 3:
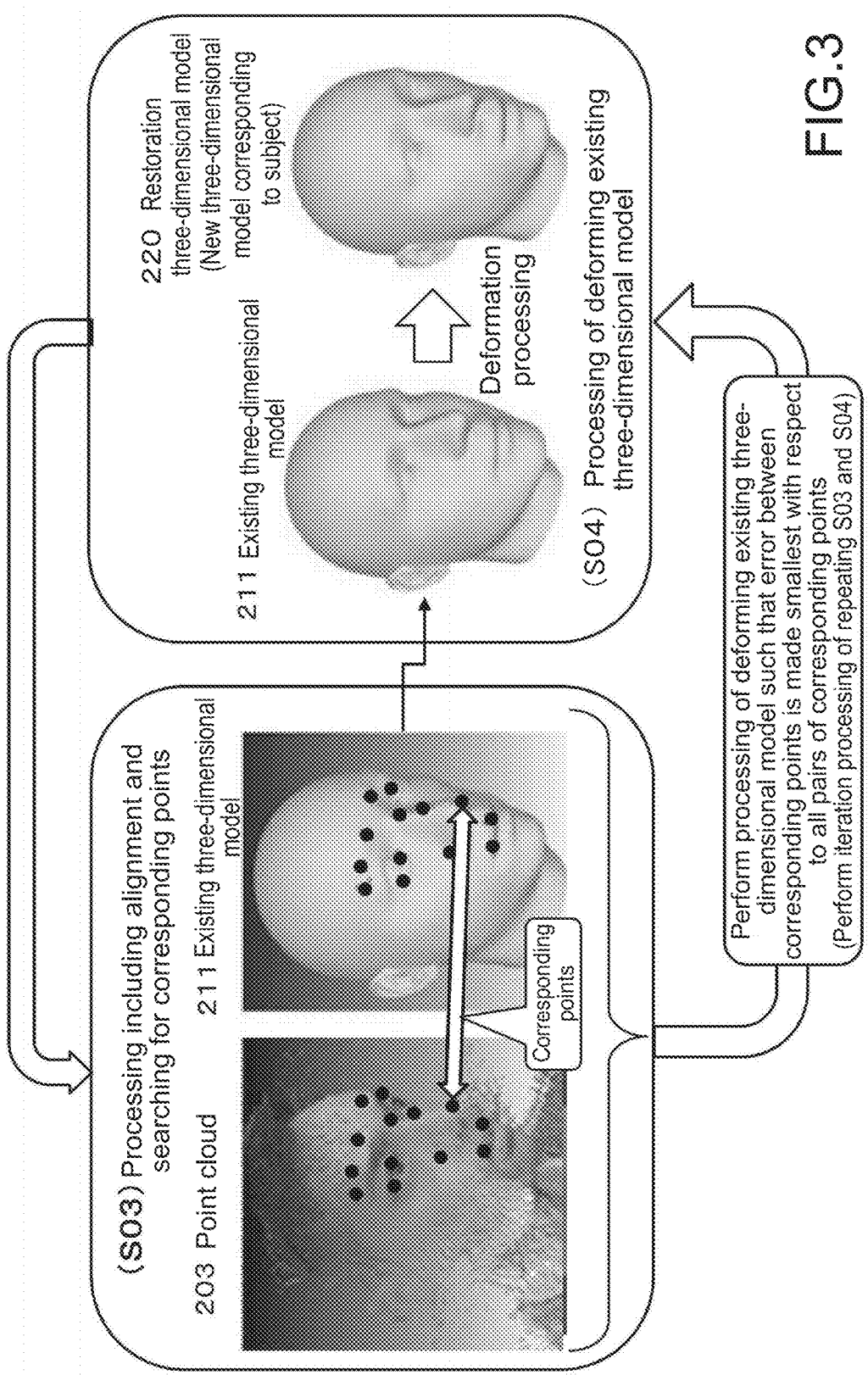
FIG. 3 is a diagram describing the processing performed by the three-dimensional shape restoring section.

Thereafter, in Step S04, the three-dimensional shape restoring section 113 deforms the existing three-dimensional model (prior model) 211 such that an error between corresponding points is reduced with respect to all of the pairs of corresponding points, and generates a restoration three-dimensional model 220, as illustrated in FIG. 3.

The restoration three-dimensional model 220 is a three-dimensional model that is closer to the subject 10 and in which an image of the face of the subject 10 is reflected.

The restoration three-dimensional model 220 is a new three-dimensional model that corresponds to the subject 10 and of which a three-dimensional shape has been restored, the three-dimensional shape including a three-dimensional shape of a hidden region (an occlusion region) that is not included in a two-dimensional image captured by the image-capturing section 20.

Return to FIG. 1 to continue the description of the configuration of the image processing apparatus 100 and the processing performed by the image processing apparatus 100.

The three-dimensional shape restoring section 113 of the image processing apparatus 100 of FIG. 1 performs the processing described with reference to FIGS. 2 and 3, and generates the restoration three-dimensional model 220 that is closer to the subject 10 and in which an image of the face of the subject 10 is reflected.

The restoration three-dimensional model 220 generated by the three-dimensional shape restoring section 113 is input to a texture projection section 114. Conversion data (such as an RGB image) generated by the conversion section 111 is also input to the texture projection section 114.

Note that structural elements from the texture projection section 114 to a color combiner 120 correspond to a texture processor that performs texture attachment processing on the restoration three-dimensional model 220 generated by the three-dimensional shape restoring section 113.

A three-dimensional model in which a natural and realistic texture is also added to an occlusion region that is not included in a two-dimensional image that is an input image, is completed due to processing performed by the texture processor including the structural elements from the texture projection section 114 to the color combiner 120.

On the basis of conversion data (such as an RGB image) generated by the conversion section 111, the texture projection section 114 performs texture projection processing on a model obtained by restoration performed by the three-dimensional shape restoring section 113, that is, the restoration three-dimensional model 220 illustrated in FIG. 3.

In other words, the texture projection section 114 performs the texture projection processing including pasting an image of each region in a two-dimensional image of the subject 10 on a corresponding region in the restoration three-dimensional model 220.

However, the two-dimensional image of the subject 10 only includes texture information regarding a certain region in the restoration three-dimensional model 220. In other words, with respect to a hidden region (an occlusion region) that is not included in the two-dimensional image, masking processing is performed, and a texture projection is not performed.

Note that a masking method such as setting of a mask region can be specified by a user. For example, when an image of a face is projected, it is possible to perform various settings, such as a setting in which a texture projection will not be performed on a region of the hair of head even if a two-dimensional image includes texture information regarding the region of the hair of head.

An approach of generating a three-dimensional model onto which a texture has been directly projected can also be applied to the texture projection processing performed by the texture projection section 114. However, it is often the case that the texture projection processing is performed using data obtained by two-dimensionally deploying a three-dimensional model, that is, so-called UV-deployment data, in order to improve the processing efficiency. Data obtained by pasting texture information on the UV-deployment data is called a UV texture map.

Figure 4:
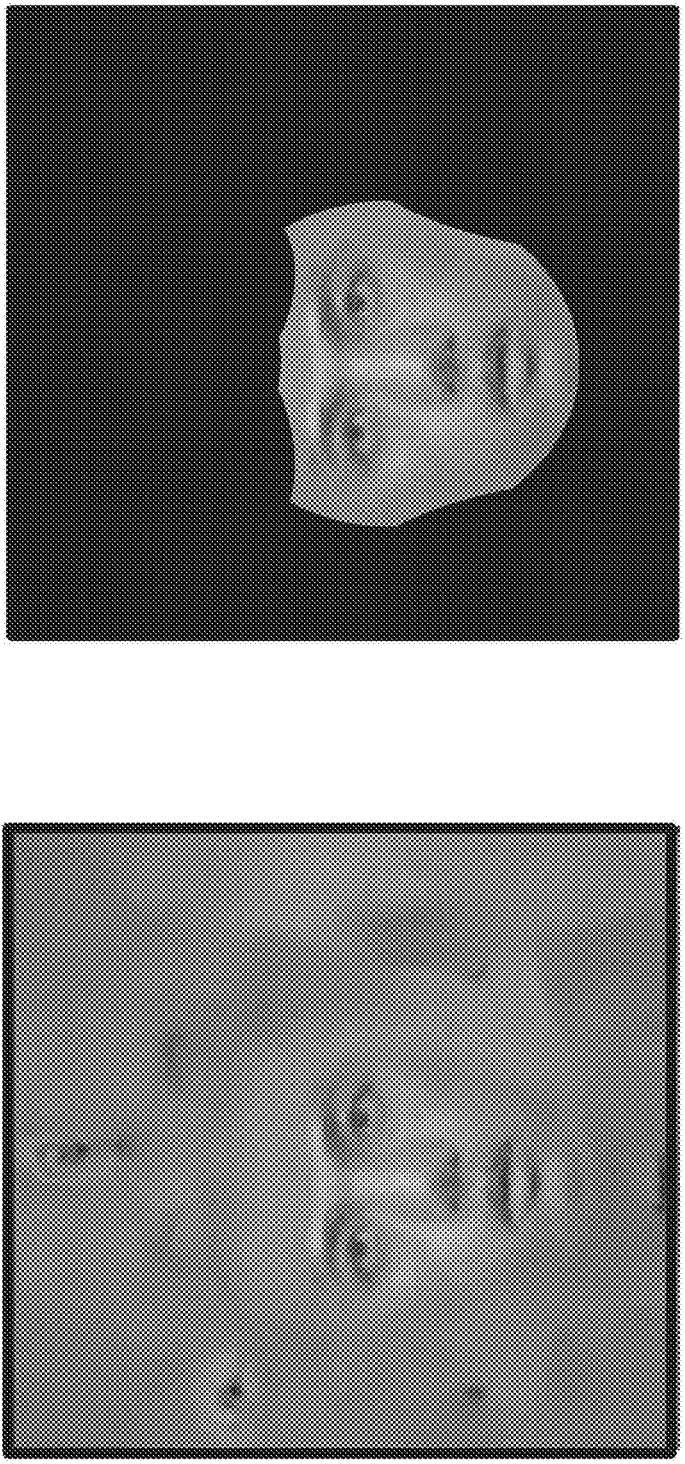
FIG. 4 illustrates examples of UV texture maps.

FIG. 4 illustrates an example of a UV texture map.

(1) of FIG. 4 illustrates an example of a UV texture map in which texture information is set for all of the regions of a three-dimensional model. A point in the UV texture map corresponds to a point in the three-dimensional model.

(2) of FIG. 4 illustrates an example of a UV texture map that is an incomplete UV texture map corresponding to an input image (a two-dimensional image) and in which texture information is set only for a region nearly corresponding to a frontal view of a face. This example corresponds to an example of a UV texture map that can be generated using the RGB image 201 of the subject 10, which is captured from the front.

A black portion corresponds to, for example, an occlusion region, and is a region for which texture information is not acquired from a two-dimensional image.

Note that a region of the hair of head is a region onto which texture information is not projected due to masking processing set by a user.

A UV texture map obtained by texture projection processing being performed by the texture projection section 114, that is, an incomplete UV texture map corresponding to an input image (a two-dimensional image) illustrated in (2) of FIG. 4 (a UV texture map that only includes texture information regarding a certain region) is input to a texture acquisition section 115.

The UV-texture map input to the texture acquisition section 115 is a three-dimensional model that only includes texture information (image information such as a color and a pattern) in a portion of the three-dimensional model. In other words, texture information is not set for a hidden region (an occlusion region) that is not included in a two-dimensional image or a mask region that has been determined by a user to not be a texture-projection target.

The texture acquisition section 115 is a processor that acquires texture information from an incomplete UV texture map 240 corresponding to an input image that is generated by the texture projection section 114 using a captured image (a two-dimensional image) of the subject 10.

Figure 5:
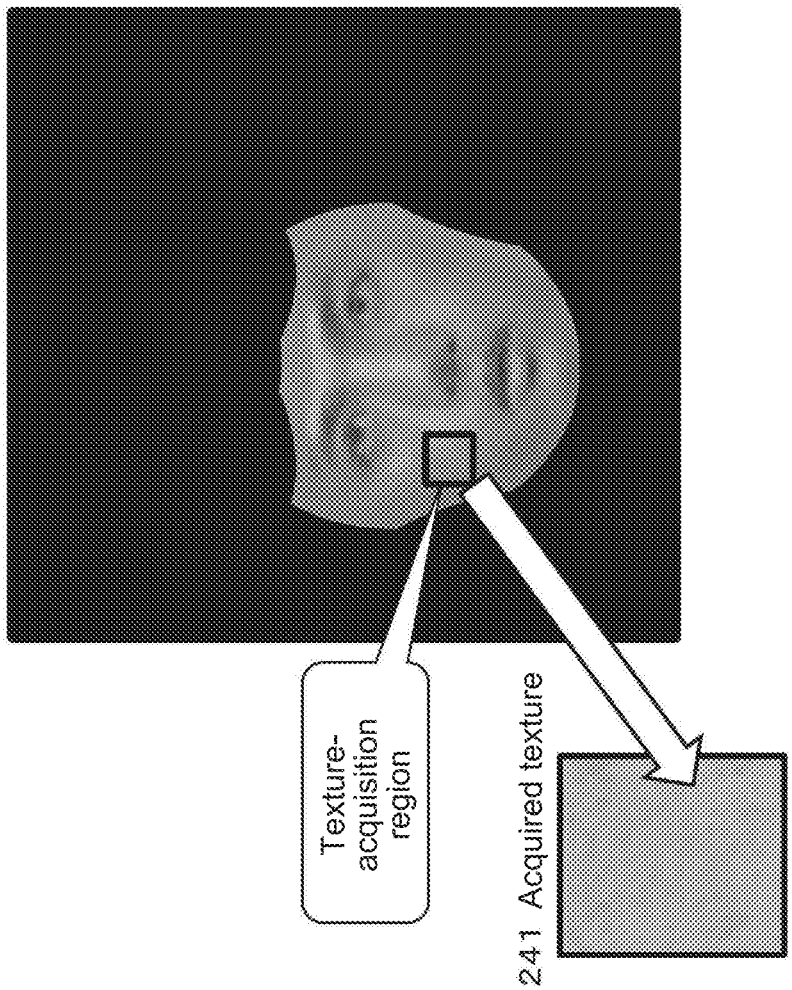
FIG. 5 is a diagram describing processing performed by a texture acquisition section.

For example, as illustrated in FIG. 5, a certain region for which a texture is set is selected as a texture-acquisition region from the incomplete UV texture map 240 corresponding to an input image, and a texture (an image) of the texture-acquisition region is acquired.

For example, an acquired texture (an image) 241 illustrated in FIG. 5 is acquired.

Note that a texture-acquisition region can be determined by various methods such as adopting a region determined in advance for each object, or adopting a region specified by a user. Note that, when the region determined in advance for each object is adopted as the texture-acquisition region, there is a possibility that no texture is set for that region or it is difficult to analyze a texture. In such cases, another region for which an analyzable texture is set is adopted as an alternative texture-acquisition region, and a texture is acquired from the alternative region.

The acquired texture (the image) 241 acquired by the texture acquisition section 115 from the incomplete UV texture map 240 corresponding to an input image is input to a texture analyzer 116.

The texture analyzer 116 performs processing of analyzing the acquired texture (the image) 241 acquired by the texture acquisition section 115.

Specifically, an image analysis of, for example, a color, a pattern, the brightness, and a texture is performed. Further, it is favorable that processing of analysis depending on the object type also be performed.

For example, an analysis of, for example, a texture of a skin is performed in the case of a human face.

The texture analyzer 116 can analyze a texture using a method specified by a user. For example, when processing of generating a three-dimensional model of a face is performed, performing an analysis of a texture of a skin as analysis processing will be effective.

Texture analysis data (auxiliary data) generated by the texture analyzer 116 is input to a texture-DB search section 117 together with the acquired texture (the image) 241 acquired by the texture acquisition section 115.

On the basis of the acquired texture 241 acquired by the texture acquisition section 115 and the texture analysis data (the auxiliary data) generated by the texture analyzer 116, the texture-DB search section 117 acquires an existing texture most similar to the acquired texture 241 from the texture database 140.

Pieces of texture data that have various features are stored in the texture database 140.

A specific example of data stored in the texture database 140 is described with reference to FIG. 6.

Figure 6:
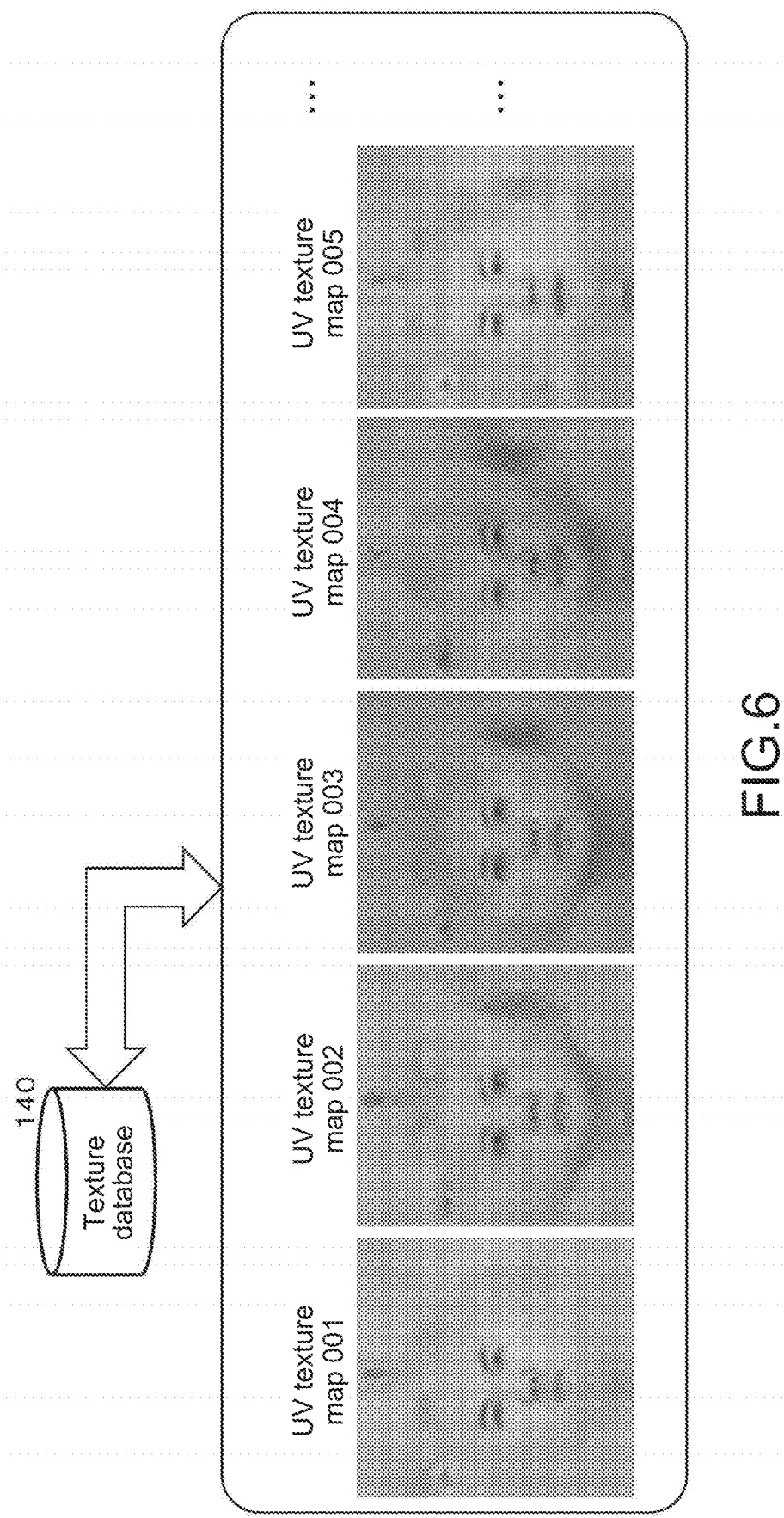
FIG. 6 illustrates a specific example of data stored in a texture database.

As illustrated in FIG. 6, various different UV texture maps are stored in the texture database 140.

Note that these UV texture maps are pieces of color data.

As described above, the UV texture map is data obtained by two-dimensionally deploying a three-dimensional model with a texture, and a point in the UV texture map corresponds to a point in the three-dimensional model.

In other words, the UV texture map is a map that includes texture information (a pixel value (for example, color information such as an RGB value)) regarding all of the points in the three-dimensional model.

Note that the texture database 140 may be a database in the image processing apparatus 100, or a database that can be accessed via, for example, the Internet may be used as the texture database 140.

Note that, in FIG. 1, the three-dimensional model database 130 and the texture database 140 are separate databases, but these databases may be a single database. In other words, a database that stores therein a three-dimensional model that includes texture information may be used as the three-dimensional model database 130 and the texture database 140.

As described above, on the basis of the acquired texture 241 acquired by the texture acquisition section 115 from the incomplete UV texture map 240 corresponding to an input image, and on the basis of the texture analysis data (the auxiliary data) generated by the texture analyzer 116, the texture-DB search section 117 acquires, from the texture database 140, data of an existing texture most similar to the acquired texture 241.

An example of processing of searching for a similar existing texture is described with reference to FIG. 7.

Figure 7:
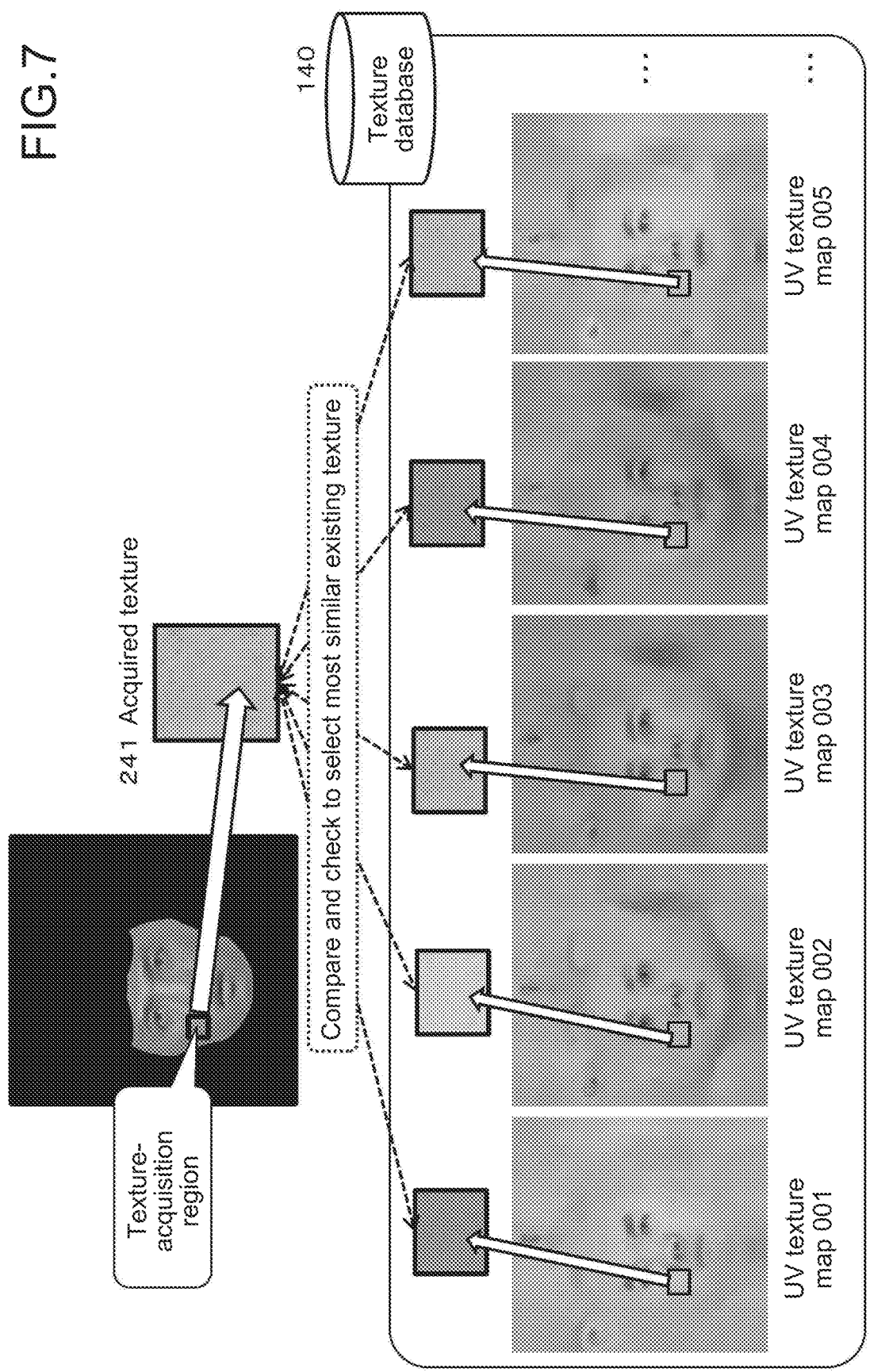
FIG. 7 is a diagram describing processing performed by a texture-DB search section.

As illustrated in FIG. 7, the texture-DB search section 117 acquires, from each UV texture map stored in the texture database 140, a texture situated at a position, in an image, that corresponds to an acquisition position at which the acquired texture 241 is acquired by the texture acquisition section 115, and compares the acquired texture 241 with the texture situated at the corresponding position in the image.

The comparison processing is performed to select a UV texture map that includes a texture most similar to the acquired texture 241. The acquired texture 241 is checked against the auxiliary information (a result of analysis of, for example, a texture of a skin) to select a UV texture map that includes a texture including a most similar component.

For example, in the example illustrated in FIG. 7, a UV texture map 005 stored in the texture database 140 is selected as a UV texture map that includes a texture most similar to the acquired texture 241.

Note that not only a UV texture map but also information regarding an attribute of each UV texture map (information regarding, for example, the color characteristics, the brightness, a texture, and a texture of a skin) may be recorded in the texture database 140, and the texture-DB search section 117 may select a similar texture on the basis of the attribute information.

An existing UV texture map that includes a similar texture and is selected from the texture database 140 is input to a color converter 118.

Processing performed by the color converter 118 is described with reference to FIG. 8.

First, the color converter 118 calculates a color conversion function that converts, into a color of the acquired texture 241, the color of a similar existing texture 251 in a similar existing UV texture map 250 selected from the texture database 140.

The similar existing texture 251 is a texture acquired by the texture-DB search section 117 performing processing of searching for a similar texture. In other words, the similar existing texture 251 is a texture (a texture of a region of the cheek) that is included in the similar existing UV texture map 250 and situated at substantially the same position as an acquisition position (a region of the cheek) at which the acquired texture 241 is acquired by the texture acquisition section 115.

The color converter 118 calculates a color conversion function that converts the color of the similar existing texture 242 into a color of the acquired texture 241 acquired from the incomplete UV texture map 240 corresponding to an input image.

Figure 8:
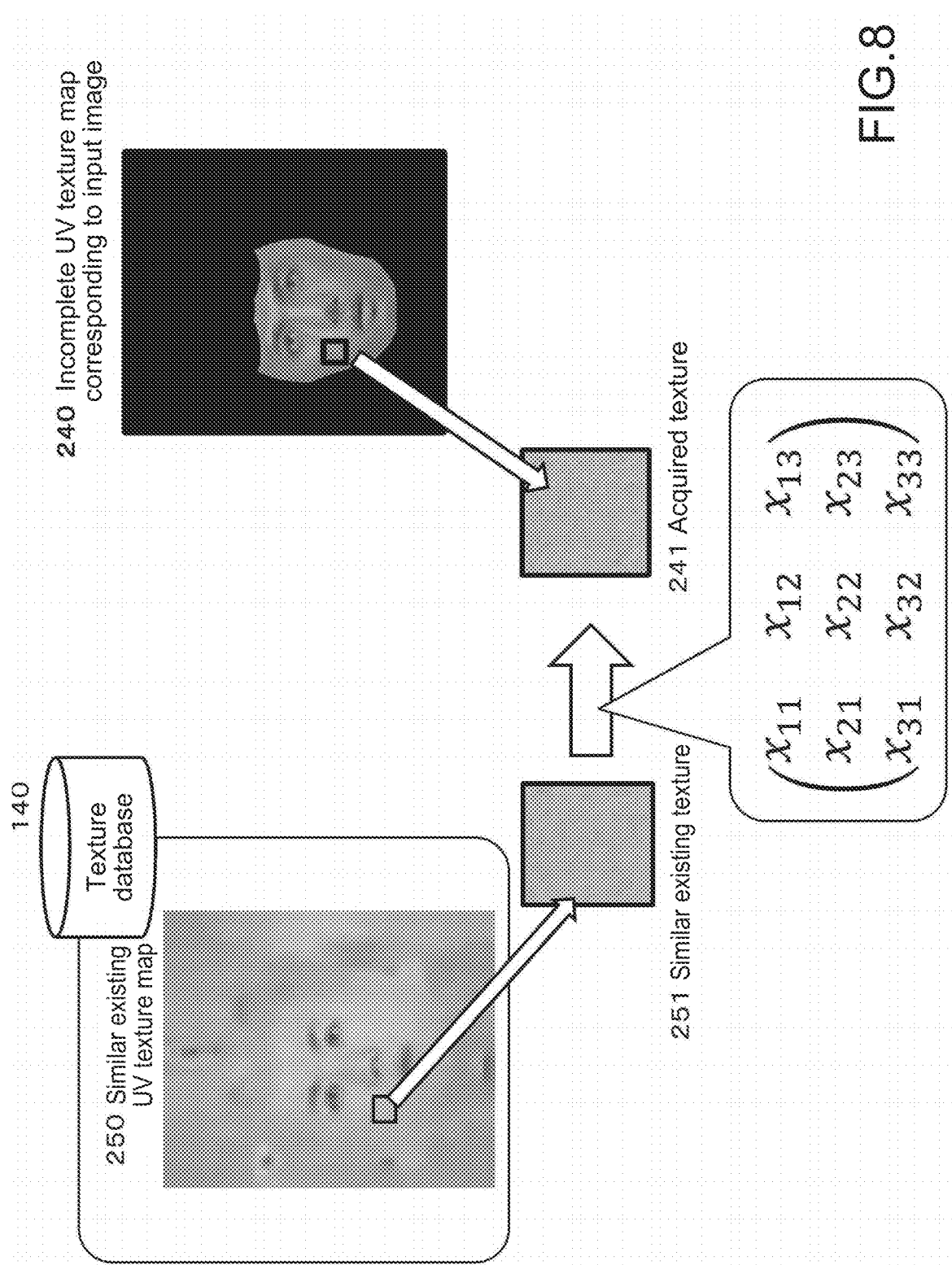
FIG. 8 is a diagram describing processing performed by a color converter.

The color conversion function is, for example, a color conversion matrix illustrated in FIG. 8.

For example, a matrix used to convert values respectively defined in an RGB color space, an HSV color space, and a Lab color space is applicable as the color conversion matrix.

The color converter 118 multiplies, by the 3×3 color conversion matrix illustrated in the figure, a color value of each pixel of the similar existing texture 242 illustrated in FIG. 8, that is, for example, a Lab value of each pixel, and the color converter 118 calculates a color conversion function (such as a color conversion matrix) that makes it possible to output a color value of the acquired texture 241.

Next, the color converter 118 applies the obtained color conversion function (such as a color conversion matrix) to perform processing of setting a texture for a region that is included in the incomplete UV texture map 240 corresponding to an input image and for which no texture is set.

A specific example of processing performed by the color converter 118, a signal processor 119, and the color combiner 120 is described with reference to FIG. 9.

Figure 9:
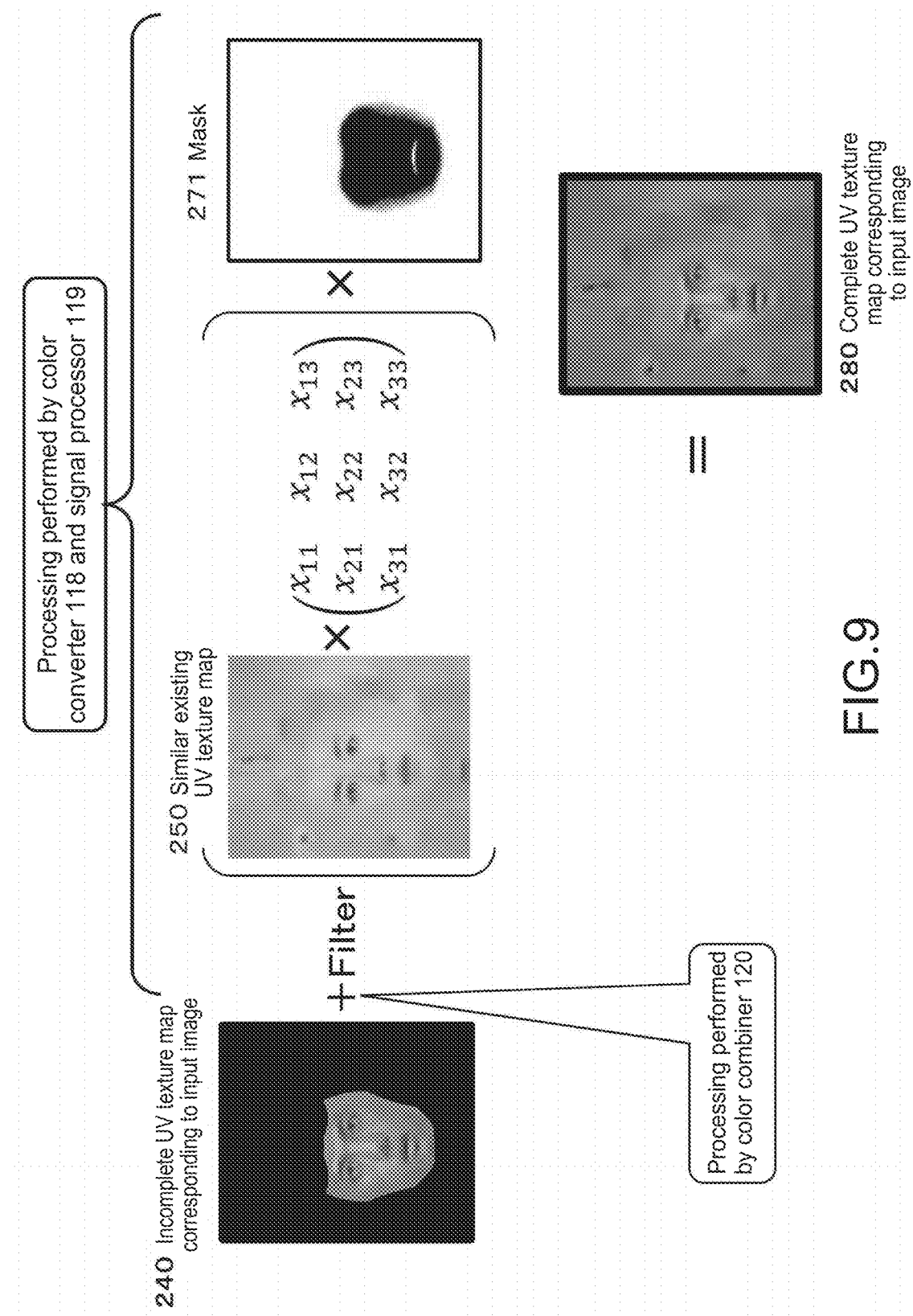
FIG. 9 is a diagram describing processing performed by the color converter, a signal processor, and a color combiner.

The incomplete UV texture map 240 corresponding to an input image illustrated in FIG. 9 is a texture map generated on the basis of an input image (a two-dimensional image), and is an incomplete texture map in which a texture is attached only to a certain region and no texture is set for, for example, an occlusion region that is a hidden region that is not included in a two-dimensional image that is a captured image.

The incomplete UV texture map 240 corresponding to an input image, and a texture map generated using an arithmetic expression starting with Filter illustrated in FIG. 9 are added, and a complete UV texture map 280 corresponding to an input image in which a texture is set for all of the regions, is generated at the end.

The arithmetic expression starting with Filter illustrated in FIG. 9 is an arithmetic expression indicated below.

$$\text{Filter}((\text{similar existing UV texture map 250})\times(\text{color conversion matrix}))\times(\text{mask})$$

The color converter 118 and the signal processor 119 perform processing corresponding to this arithmetic expression.

The color combiner 120 performs addition processing of adding the incomplete UV texture map 240 corresponding to an input image, and the texture map generated using the arithmetic expression starting with Filter.

First, the processing that is performed by the color converter 118 and the signal processor 119 and corresponds to the following arithmetic expression starting with Filter, is described.

$$\text{Filter}((\text{similar existing UV texture map 250})\times(\text{color conversion matrix}))\times(\text{mask})$$

The color converter 118 and the signal processor 119 multiply, by the color conversion matrix described above with reference to FIG. 8, a pixel value of each pixel of the similar existing UV texture map 250 selected from the texture database 140, perform filtering processing on a result of the multiplication, and further multiply the result of the multiplication by a mask 271.

The mask 271 is a mask in which a texture setting region in the incomplete UV texture map 240 corresponding to an input image=0, and a texture unsetting region in the incomplete UV texture map 240 corresponding to an input image=1.

A texture map in which a texture is set only for the texture unsetting region in the complete UV texture map 280 corresponding to an input image, is generated using the following arithmetic expression.

Filter((similar existing UV texture map 250)×(color conversion matrix))×(mask)

A texture to be set is a texture that has a color into which the color of a texture of the similar existing UV texture map 250 has been converted using a color conversion matrix.

In other words, the texture to be set is a texture that has a color closer to a color of a texture of the complete UV texture map 280 corresponding to an input image due to the color conversion processing being performed.

As described above, using an obtained color conversion function (such as a color conversion matrix), the color converter 118 and the signal processor 119 perform processing of setting a texture for a region that is included in the incomplete UV texture map 240 corresponding to an input image and for which no texture is set.

Processing performed by the signal processor 119 performing processing corresponding to [Filter] in the arithmetic expression illustrated in FIG. 9, is described.

[Filter] indicates filtering processing.

The signal processor 119 performs signal processing to reduce a difference between two texture regions indicated below.

(a) a texture region that is included, from the beginning, in the incomplete UV texture map 240 corresponding to an input image (b) a texture region that is newly added by color conversion processing being performed on the similar existing UV texture map 250

Specifically, with respect to, for example, the texture region (b) described above, that is, the texture region (b) that is newly added by color conversion processing being performed on the similar existing UV texture map 250, signal processing such as resolution conversion processing, blurring processing, and sharpness processing is performed to reduce a difference between the texture region (b) described above and the region (a) described above, that is, the texture region (a) that is included, from the beginning, in the incomplete UV texture map 240 corresponding to an input image.

As described above, when, for example, a texture region that is newly added by color conversion processing being performed on the similar existing UV texture map 250, and a texture region that is included, from the beginning, in the incomplete UV texture map 240 corresponding to an input image do not have the same resolution or the same level of noise, the signal processor 119 performs correction processing (filtering processing) on a pixel value of the texture region that is newly added by color conversion processing being performed on the similar existing UV texture map 250, such that those textures have the same resolution or the same level of noise.

Next, processing performed by the color combiner 120 performing the addition processing included in the arithmetic expression illustrated in FIG. 9, is described.

The color combiner 120 performs processing of combining (adding) two texture maps indicated below.

(a) the incomplete UV texture map 240 corresponding to an input image (b) a UV texture map newly generated by color conversion processing and signal processing being performed on the similar existing UV texture map 250

The addition processing results in generating, at the end, the complete UV texture map 280 corresponding to an input image in which a texture is set for all of the regions.

Note that it is favorable that the color combiner 120 perform alpha blending (processing of combining pixel values of two adjacent pixels using coefficients (alpha values)) as correction processing on a value of a pixel situated around a boundary between two texture regions upon combining in order to reduce a feeling of strangeness with respect to the boundary.

As described above, the color converter 118, the signal processor 119, and the color combiner 120 perform processing in conformity to the arithmetic expression illustrated in FIG. 9, and generate, at the end, the complete UV texture map 280 corresponding to an input image in which a texture is set for all of the regions.

In other words, (incomplete UV texture map 240 corresponding to an input image)+Filter ((similar existing UV texture map 250)×(color conversion matrix))×(mask)=complete UV texture map 280 corresponding to an input image (Formula 1).

The color converter 118, the signal processor 119, and the color combiner 120 perform processing in conformity to the arithmetic expression (Formula 1) described above, and generate, at the end, the complete UV texture map 280 corresponding to an input image in which a texture is set for all of the regions.

The complete UV texture map 280 corresponding to an input image in which a texture is set for all of the regions, is converted into a three-dimensional model (a three-dimensional image) by a three-dimensional-model output section 121, and the three-dimensional model is displayed on a display section 30.

Note that the three-dimensional model generated here is a model that has a three-dimensional shape of the restoration three-dimensional model 220 generated by the processing of deforming an existing three-dimensional model generated by the three-dimensional shape restoring section 113, the deformation processing being described with reference to FIGS. 2 and 3 above. The three-dimensional model generated here is a three-dimensional model (a three-dimensional image) in which a texture corresponding to the complete UV texture map 280 corresponding to an input image described with reference to FIG. 9 is set for the restoration three-dimensional model 220.

Figure 10:
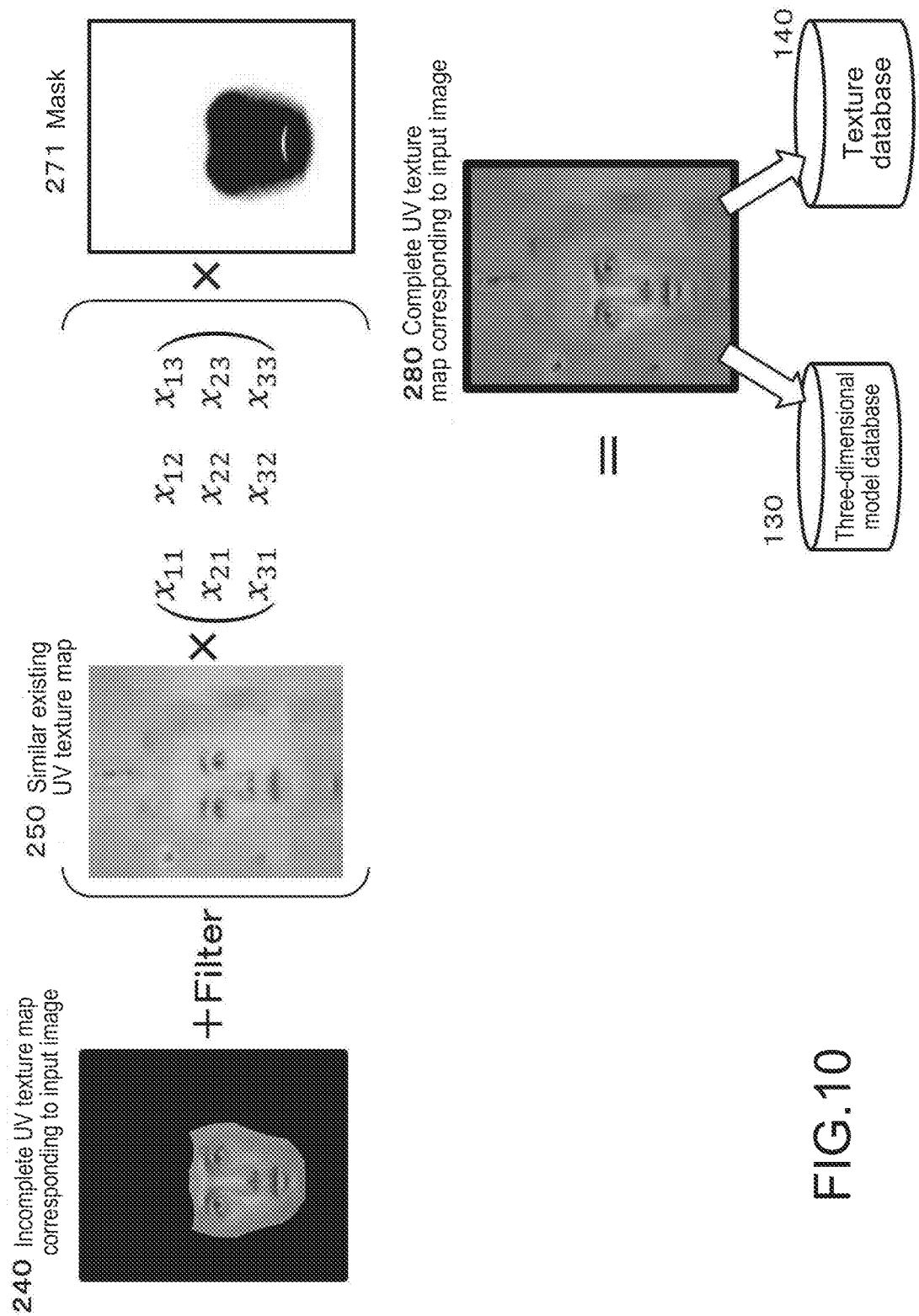
FIG. 10 is a diagram describing the processing performed by the color converter, the signal processor, and the color combiner.

Note that a three-dimensional model that includes a texture generated by applying the configuration of the image processing apparatus 100 illustrated in FIG. 1, and a UV texture map of the three-dimensional model may be stored in the three-dimensional model database 130 or the texture database 140 as new registered data, as illustrated in FIG. 10.

[3. Sequence of Processing Performed by Image Processing Apparatus of Present Disclosure]

Next, a sequence of processing performed by the image processing apparatus of the present disclosure is described.

Figure 11:
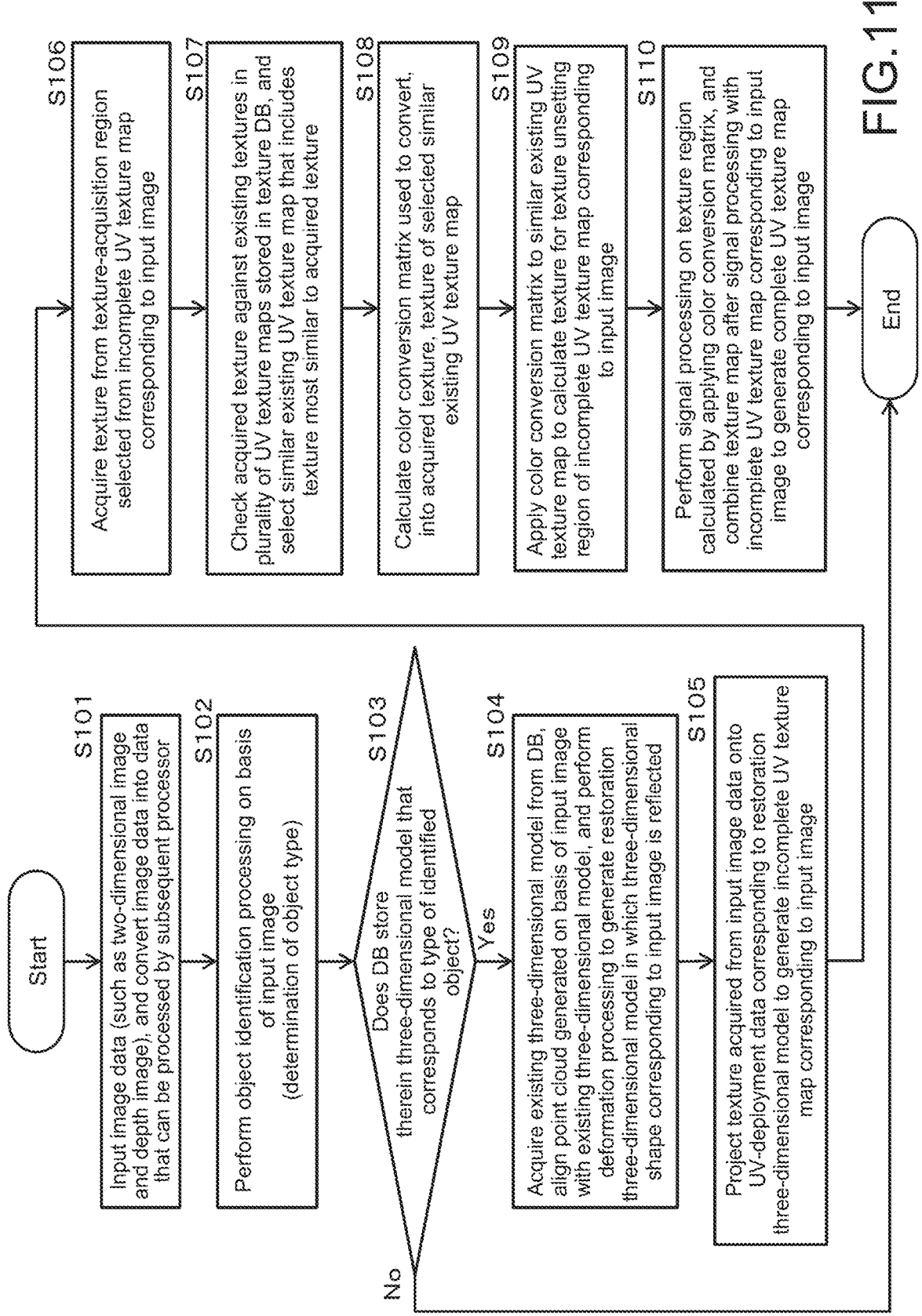
FIG. 11 is a flowchart illustrating a sequence of processing performed by the image processing apparatus of the present disclosure.

A flowchart illustrated in FIG. 11 is a flowchart illustrating a sequence of processing performed by the image processing apparatus 100 of the present disclosure.

Note that, for example, according to a program stored in a storage of the image processing apparatus 100, the processing according to the flowchart illustrated in FIG. 11 is performed under the control of a data processor that includes a controller that includes, for example, a CPU including a function of executing a program.

The processes of respective steps of the flow illustrated in FIG. 11 are described one by one.

(Step S101)

First, in Step S101, the image processing apparatus 100 performs processing that includes inputting image data that is data from which a three-dimensional model is generated, and converting the image data into data that can be processed by a subsequent processor. For example, image data such as a two-dimensional image and a depth image is input to perform data conversion.

The processing is performed by the input-data analysis and conversion section 111 of the image processing apparatus 100 illustrated in FIG. 1. The input-data analysis and conversion section 111 analyzes image data input by the image-capturing section 20, and performs conversion on the image data. For example, when an RGB color image is input, the input-data analysis and conversion section 111 converts the RGB color image into data in a format such as bitmap. Further, when a range image (a depth image) is input, the input-data analysis and conversion section 111 performs processing of, for example, converting the input image into 16-bit tiff data.

Note that data may be converted into any format in which data can be processed by each subsequent processor, and the processable data format differs depending on the configuration of the subsequent processor.

(Step S102)

Next, in Step S102, the image processing apparatus 100 performs object identification processing on the basis of the input image. In other words, the object type is determined.

This processing is processing performed by the object recognition section 112 of the image processing apparatus 100 illustrated in FIG. 1.

The object recognition section 112 analyzes an RGB image and a depth image, and determines the object type of a subject (an object).

(Step S103)

Next, in Step S103, the image processing apparatus 100 determines whether a three-dimensional model that corresponds to a type of an identified object is stored in the three-dimensional model database 130.

This processing is also processing performed by the object recognition section 112 of the image processing apparatus 100 illustrated in FIG. 1.

The object recognition section 112 determines whether an existing three-dimensional model (a prior model) that corresponds to the object type determined in Step S102, is in the three-dimensional model database 130.

When the corresponding existing three-dimensional model is stored in the database, the process moves on to Step S104.

On the other hand, when the corresponding existing three-dimensional model is not stored in the database, the processing of the present disclosure is terminated since the processing is not performed.

(Step S104)

The processes of and after Step S104 are performed when an existing three-dimensional model (a prior model) that corresponds to the object type determined in Step S102, has been determined to be in the three-dimensional model database 130.

In this case, in Step S104, the image processing apparatus 100 acquires the existing three-dimensional model from the three-dimensional model database 130, aligns a point cloud generated on the basis of the input image with the existing three-dimensional model, and performs deformation processing to generate a restoration three-dimensional model in which a three-dimensional shape corresponding to the input image is reflected.

This processing is processing performed by the three-dimensional shape restoring section 113 of the image processing apparatus 100 illustrated in FIG. 1.

The three-dimensional shape restoring section 113 performs the processing described above with reference to FIGS. 2 and 3.

In other words, first, the three-dimensional shape restoring section 113 generates, on the basis of a depth image, a point cloud obtained by representing the depth image in the form of point cloud data on three-dimensional coordinates.

Next, the three-dimensional shape restoring section 113 selects, from the three-dimensional model database 130, an existing three-dimensional model (a prior model) that matches a type of an object identified by the object recognition section 112.

Next, the three-dimensional shape restoring section 113 performs alignment of the generated point cloud with the existing three-dimensional model (the prior model) of a human face that has been acquired from the three-dimensional model database 130, and sets a pair of corresponding vertices.

Thereafter, the three-dimensional shape restoring section 113 deforms the existing three-dimensional model (the prior model) such that an error between corresponding points is reduced with respect to all of the pairs of corresponding points, and generates the restoration three-dimensional model 220, as illustrated in FIG. 3.

The restoration three-dimensional model 220 is a three-dimensional model that is closer to the subject 10 and in which an image of the face of the subject 10 is reflected.

(Step S105)

Next, in Step S105, the image processing apparatus 100 projects a texture acquired from input image data onto UV-deployment data corresponding to a restoration three-dimensional model to generate an incomplete UV texture map corresponding to an input image.

This processing is processing performed by the texture projection section 114 of the image processing apparatus 100 illustrated in FIG. 1.

On the basis of conversion data (such as an RGB image) generated by the conversion section 111, the texture projection section 114 performs texture projection processing on a model obtained by restoration performed by the three-dimensional shape restoring section 113, that is, the restoration three-dimensional model 220 illustrated in FIG. 3.

In other words, the texture projection section 114 performs the texture projection processing including pasting an image of each region in a two-dimensional image of the subject 10 on a corresponding region in the restoration three-dimensional model 220.

However, the two-dimensional image of the subject 10 only includes texture information regarding a certain region in the restoration three-dimensional model 220. In other words, with respect to a hidden region (an occlusion region)

that is not included in the two-dimensional image, masking processing is performed, and a texture projection is not performed.

Note that a masking method such as setting of a mask region can be specified by a user. For example, when an image of a face is projected, it is possible to perform various settings, such as a setting in which a texture projection will not be performed on a region of the hair of head even if a two-dimensional image includes texture information regarding the region of the hair of head.

An approach of generating a three-dimensional model onto which a texture has been directly projected can also be applied to the texture projection processing performed by the texture projection section 114. However, it is often the case that the texture projection processing is performed using data obtained by two-dimensionally deploying a three-dimensional model, that is, so-called UV-deployment data, in order to improve the processing efficiency. Data obtained by pasting texture information on the UV-deployment data is called a UV texture map.

For example, the incomplete UV texture map corresponding to an input image illustrated in (2) of FIG. 4 is generated.

(Step S106)

Next, in Step S106, the image processing apparatus 100 acquires a texture from a texture-acquisition region selected from an incomplete UV texture map corresponding to an input image.

This processing is processing performed by the texture acquisition section 115 of the image processing apparatus 100 illustrated in FIG. 1.

The texture acquisition section 115 acquires texture information from the incomplete UV texture map 240 corresponding to an input image that is generated by the texture projection section 114 using a captured image (a two-dimensional image) of the subject 10.

For example, as illustrated in FIG. 5, the acquired texture (the image) 241 is acquired from a certain region that is included in the incomplete UV texture map 240 corresponding to an input image and for which a texture is set.

(Step S107)

Next, in Step S107, the image-processing apparatus 100 checks an acquired texture against existing textures in a plurality of UV texture maps stored in the texture DB 140, and selects a similar existing UV texture map that includes a texture most similar to the acquired texture.

This processing is processing performed by the texture-DB search section 117 of the image processing apparatus 100 illustrated in FIG. 1.

On the basis of the acquired texture 241 acquired by the texture acquisition section 115 and texture analysis data (auxiliary data) generated by the texture analyzer 116, the texture-DB search section 117 acquires an existing texture most similar to the acquired texture 241 from the texture database 140.

As described above with reference to FIG. 7, the texture-DB search section 117 acquires, from each UV texture map stored in the texture database 140, a texture situated at a position, in an image, that corresponds to an acquisition position at which the acquired texture 241 is acquired by the texture acquisition section 115, and compares the acquired texture 241 with the texture situated at the corresponding position in the image.

The comparison processing is performed to select a UV texture map that includes a texture most similar to the acquired texture 241. The acquired texture 241 is checked against the auxiliary information (a result of analysis of, for example, a texture of a skin) to select a UV texture map that includes a texture including a most similar component.

(Step S108)

Next, in Step S108, the image-processing apparatus 100 calculates a color conversion matrix used to convert, into the acquired texture, a texture of the selected similar existing UV texture map.

This processing is processing performed by the color converter 118 of the image processing apparatus 100 illustrated in FIG. 1.

The color converter 118 calculates a color conversion function that converts the color of the similar existing texture 242 into a color of the acquired texture 241 acquired from the incomplete UV texture map 240 corresponding to an input image.

The color conversion function is, for example, the color conversion matrix illustrated in FIG. 8.

For example, a matrix used to convert values respectively defined in an RGB color space, an HSV color space, and a Lab color space is applicable as the color conversion matrix.

(Step S109)

Next, in Step S109, the image processing apparatus 100 applies the color conversion matrix to the similar existing UV texture map to calculate a texture for a texture unsetting region of the incomplete UV texture map corresponding to an input image.

This processing is also processing performed by the color converter 118 of the image processing apparatus 100 illustrated in FIG. 1.

The color converter 118 applies the color conversion function obtained in Step S108 (such as a color conversion matrix) to perform processing of setting a texture for a region that is included in the incomplete UV texture map 240 corresponding to an input image illustrated in FIG. 8 and for which no texture is set.

This processing is the processing described above with reference to FIG. 9, that is, processing that corresponds to the following arithmetic expression starting with Filter in the arithmetic expression illustrated in FIG. 9.

Filter((similar existing UV texture map 250)×(color conversion matrix))×(mask)

The color converter 118 multiplies, by the color conversion matrix described above with reference to FIG. 8, a pixel value of each pixel of the similar existing UV texture map 250 selected from the texture database 140, and further multiplies, by the mask 271, a result of filtering performed on a result of the multiplication.

The mask 271 is a mask in which a texture setting region in the incomplete UV texture map 240 corresponding to an input image=0, and a texture unsetting region in the incomplete UV texture map 240 corresponding to an input image=1.

A texture map in which a texture is set only for the texture unsetting region in the complete UV texture map 280 corresponding to an input image, is generated using the following arithmetic expression.

Filter((similar existing UV texture map 250)×(color conversion matrix))×(mask)

A texture to be set is a texture that has a color into which the color of a texture of the similar existing UV texture map 250 has been converted using a color conversion matrix.

In other words, the texture to be set is a texture that has a color closer to a color of a texture of the complete UV texture map 280 corresponding to an input image due to the color conversion processing being performed.

(Step S110)

Next, in Step S110, the image processing apparatus 100 performs signal processing on a texture region calculated by applying the color conversion matrix, and combines a texture map after the signal processing with an incomplete UV texture map corresponding to an input image to generate a complete UV texture map corresponding to an input image.

This processing is processing performed by the signal processor 119 and the color combiner 120 of the image processing apparatus 100 illustrated in FIG. 1.

As described above with reference to FIG. 9, the signal processor 119 performs the processing corresponding to [Filter] in the arithmetic expression illustrated in FIG. 9.

Further, the color combiner 120 performs the addition processing in the arithmetic expression illustrated in FIG. 9.

First, the signal processor 119 performs signal processing to reduce a difference between two texture regions indicated below.

(a) a texture region that is included, from the beginning, in the incomplete UV texture map 240 corresponding to an input image (b) a texture region that is newly added by color conversion processing being performed on the similar existing UV texture map 250

Specifically, with respect to, for example, the texture region (b) described above, that is, the texture region (b) that is newly added by color conversion processing being performed on the similar existing UV texture map 250, signal processing such as resolution conversion processing, blurring processing, and sharpness processing is performed to reduce a difference between the texture region (b) described above and the region (a) described above, that is, the texture region (a) that is included, from the beginning, in the incomplete UV texture map 240 corresponding to an input image.

Next, the color combiner 120 performs processing of combining (adding) two texture maps indicated below.

(a) the incomplete UV texture map 240 corresponding to an input image (b) a UV texture map newly generated by color conversion processing and signal processing being performed on the similar existing UV texture map 250

The addition processing results in generating, at the end, the complete UV texture map 280 corresponding to an input image in which a texture is set for all of the regions.

Thereafter, the complete UV texture map 280 corresponding to an input image in which a texture is set for all of the regions, is converted into a three-dimensional model (a three-dimensional image) by a three-dimensional-model output section 121, and the three-dimensional model is displayed on the display section 30.

Note that the three-dimensional model generated here is a model that has a three-dimensional shape of the restoration three-dimensional model 220 generated by the processing of deforming an existing three-dimensional model generated by the three-dimensional shape restoring section 113, the deformation processing being described with reference to FIGS. 2 and 3 above. The three-dimensional model generated here is a three-dimensional model (a three-dimensional image) in which a texture corresponding to the complete UV texture map 280 corresponding to an input image described with reference to FIG. 9 is set for the restoration three-dimensional model 220.

Note that the example of generating a three-dimensional model of a human face has been described above. However, not only a human face but also any object for which there exists an existing three-dimensional model or existing texture data may be a processing target for the processing of the present disclosure. For example, the processing of the present disclosure may be used to perform processing of generating three-dimensional models of various objects such as a human face, a human body, an animal, a plant, a structure, and a building.

[4. Example of Hardware Configuration of Image Processing Apparatus]

Next, an example of a hardware configuration of the image processing apparatus of the present disclosure is described with reference to FIG. 12.

Specifically, the image processing apparatus of the present disclosure can be implemented by, for example, an information processing apparatus such as a personal computer (PC).

Figure 12:
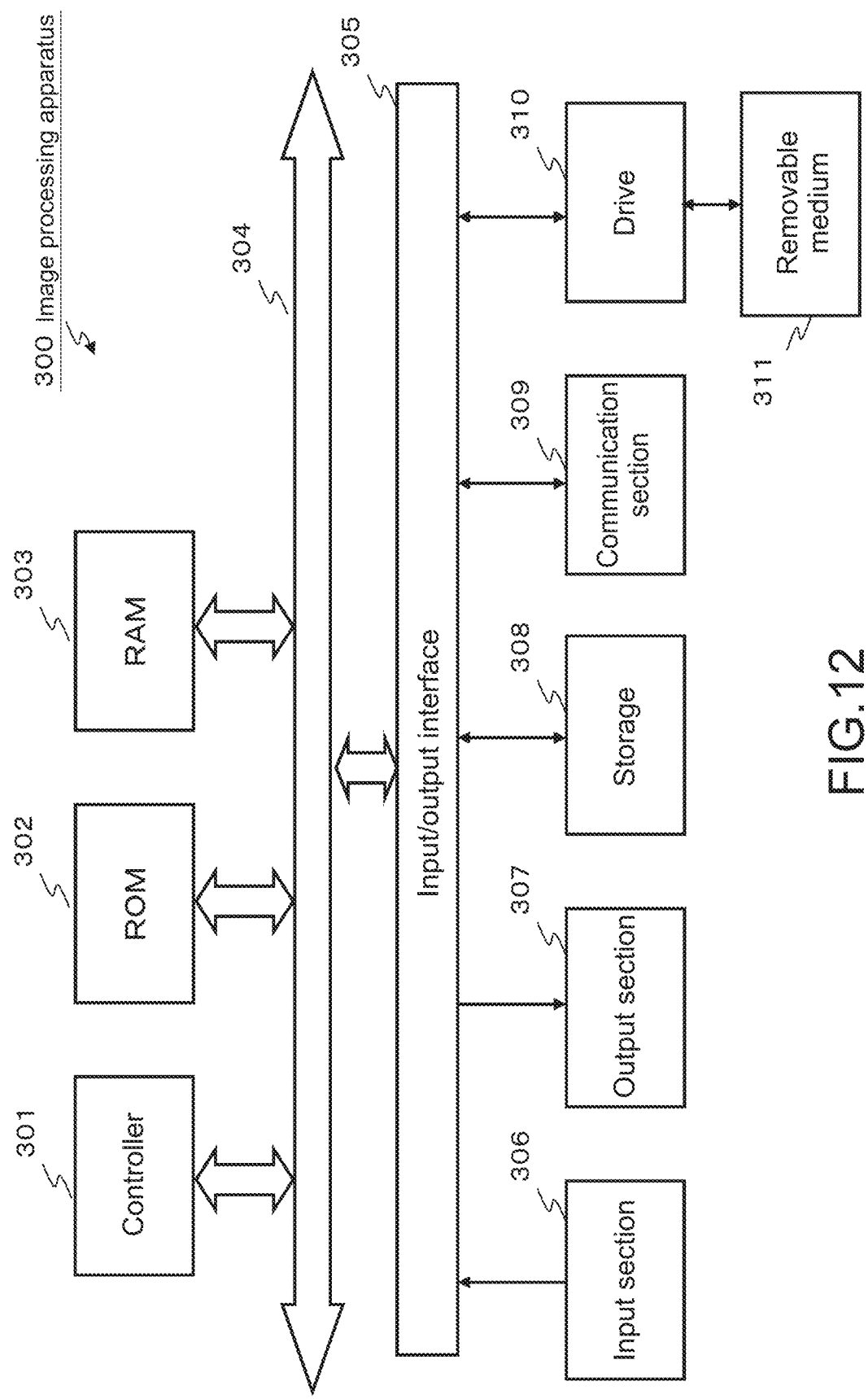
FIG. 12 illustrates an example of a hardware configuration of the image processing apparatus.

As illustrated in FIG. 12, an image processing apparatus 300 includes a controller 301, a read only memory (ROM) 302, a random access memory (RAM) 303, an input/output interface 305, and a bus 304 through which those structural elements are connected to each other.

The controller 301 accesses, for example, the RAM 303 as appropriate when necessary, and comprehensively controls the entirety of respective blocks of the image processing apparatus 300 while performing various arithmetic processes. The controller 301 may be, for example, a central processing unit (CPU) or a graphics processing unit (GPU). The ROM 302 is a nonvolatile memory that statically stores therein firmware, such as an OS, a program, and various parameters, that is executed by the controller 301. The RAM 303 is used as, for example, a work region for the controller 301, and temporarily holds an OS, various applications that are being executed, and various pieces of data that are being processed.

For example, an input section 306, an output section 307, a storage 308, a communication section 309, and a drive 310 to which a removable medium 311 can be mounted are connected to the input/output interface 305.

Note that, in addition to being connected to these structural elements, the input/output interface 105 may be configured such that the input/output interface 105 can be connected to an external peripheral device through, for example, a universal serial bus (USB) terminal or an IEEE terminal.

The input section 306 is, for example, an input section that makes it possible to input an image captured by the image-capturing section 20 illustrated in FIG. 1, and to further input, for example, information regarding an operation performed by a user. The input section 306 may include an image-capturing section.

The input section 306 may also include, for example, a pointing device such as a mouse; a keyboard; a touch panel; and other input apparatuses.

The output section 307 outputs data to the display section 30 illustrated in FIG. 1. The output section 307 may include a display section.

Examples of the storage 308 include a nonvolatile memory such as a hard disk drive (HDD), a flash memory (a solid-state drive; SSD), and other solid-state memories. The storage 308 stores therein an OS, various applications, and various pieces of data. Further, the storage 308 is also used as a region used to store, for example, an input image, image information, and a group of generated output images.

The communication section 309 is, for example, a network interface card (NIC) for Ethernet (registered trademark) and performs processing of communication through a network.

The drive 310 is used to record data and perform reproduction processing using the removable medium 311.

Examples of the removable medium 311 include a BD, a DVD, a CD, an HDD, and a flash memory.

[5. Summary of Configuration of Present Disclosure]

The embodiments of the present disclosure have been described above in details with reference to the specific examples. However, it is clear that those skilled in the art could make modifications or alterations thereto without departing from the scope of the present disclosure. In other words, the present disclosure has been described illustratively, and should not be restrictively interpreted. The claims should be considered in order to determine the scope of the present disclosure.

Note that the technology disclosed herein may take the following configurations.

(1) An image processing apparatus, including:

a three-dimensional shape restoring section to which a two-dimensional image is input, the three-dimensional shape restoring section generating a three-dimensional model corresponding to the input image; and a texture processor that attaches a texture to the three-dimensional model generated by the three-dimensional shape restoring section, the texture processor performing processing of acquiring, from a texture database, an existing texture that is similar to an acquired texture acquired from the two-dimensional image, processing of calculating a conversion function that is used so that the existing texture has a color closer to a color of the acquired texture, and processing of setting, for a texture unsetting region in the three-dimensional model, a texture calculated by applying the conversion function to the existing texture, the texture unsetting region being a region of which a texture is not obtained from the two-dimensional image.

(2) The image processing apparatus according to (1), in which the texture processor sets, for an occlusion region in the three-dimensional model, the texture calculated by applying the conversion function to the existing texture, the occlusion region being a region of which a texture is not obtained from the two-dimensional image.

(3) The image processing apparatus according to (1) or (2), in which the texture processor calculates a color conversion matrix as the conversion function that is used so that the existing texture has a color closer to the color of the acquired texture.

(4) The image processing apparatus according to any one of (1) to (3), in which the texture database is a database that stores therein a UV texture map that is texture data corresponding to the three-dimensional model, from a plurality of the UV texture maps stored in the texture database, the texture processor acquires textures of a region identical to an acquisition region of the acquired texture acquired from the two-dimensional image, and the texture processor selects and acquires the UV texture map including the texture most similar to the acquired texture acquired from the two-dimensional image.

(5) The image processing apparatus according to (4), in which the texture processor sets, for the three-dimensional model, a texture calculated by applying the conversion function to the UV texture map.

(6) The image processing apparatus according to any one of (1) to (5), in which the texture processor includes a texture analyzer that analyzes the acquired texture acquired from the two-dimensional image, and a texture-database search section that selects the existing texture similar to the acquired texture from the texture database on the basis of a result of the analysis performed by the texture analyzer.

(7) The image processing apparatus according to (6), in which the texture analyzer performs processing of the texture analysis according to a designation of a user.

(8) The image processing apparatus according to (6) or (7), in which a UV texture map that is texture data corresponding to the three-dimensional model, and information regarding an attribute of the UV texture map are recorded in the texture database in association with each other, and the texture-database search section performs processing of searching for a texture using the attribute information.

(9) The image processing apparatus according to any one of (1) to (8), further including an object recognition section that performs an object identification on the basis of the input image, the object recognition section determining a type of an object for which a three-dimensional model is to be generated, in which the three-dimensional shape restoring section acquires, from a database, an existing three-dimensional model of which a type matches the determined type of the object, and deforms the acquired existing three-dimensional model to generate the three-dimensional model corresponding to the input image.

(10) The image processing apparatus according to (9), in which the three-dimensional shape restoring section generates a point cloud that includes point cloud data on three-dimensional coordinates using a depth image that is included in the input image, and the three-dimensional shape restoring section detects a point of the generated point cloud and a point of the existing three-dimensional model that correspond to each other, performs processing of deforming the existing three-dimensional model such that an error between the corresponding points is reduced, and generates the three-dimensional model corresponding to the input image.

(11) The image processing apparatus according to any one of (1) to (10), in which the texture processor includes a color converter that performs the processing of calculating a conversion function that is used so that the existing texture has a color closer to a color of the acquired texture, and the processing of setting, for a texture unsetting region in the three-dimensional model, a texture calculated by applying the conversion function to the existing texture, the texture unsetting region being a region of which a texture is not obtained from the two-dimensional image, and a signal processor that performs signal processing to reduce a difference between a texture generated by the color converter and a texture obtained from the input image.

(12) The image processing apparatus according to (11), in which the signal processor performs at least one of resolution conversion processing, blurring processing, and sharpness processing with respect to the texture generated by the color converter.

(13) An image processing method that is performed by an image processing apparatus, the image processing method including:

performing three-dimensional shape restoring processing that includes inputting a two-dimensional image to a three-dimensional shape restoring section, and generating, by the three-dimensional shape restoring section, a three-dimensional model corresponding to the input image; and attaching, by a texture processor, a texture to the three-dimensional model generated by the three-dimensional shape restoring section, the attaching the texture to the three-dimensional model including performing processing of acquiring, from a texture database, an existing texture that is similar to an acquired texture acquired from the two-dimensional image, processing of calculating a conversion function that is used so that the existing texture has a color closer to a color of the acquired texture, and processing of setting, for a texture unsetting region in the three-dimensional model, a texture calculated by applying the conversion function to the existing texture, the texture unsetting region being a region of which a texture is not obtained from the two-dimensional image.

(14) A program that causes an image processing apparatus to perform image processing including:

performing three-dimensional shape restoring processing that includes inputting a two-dimensional image to a three-dimensional shape restoring section, and the three-dimensional shape restoring section generating a three-dimensional model corresponding to the input image; and a texture processor attaching a texture to the three-dimensional model generated by the three-dimensional shape restoring section, the attaching the texture to the three-dimensional model including performing processing of acquiring, from a texture database, an existing texture that is similar to an acquired texture acquired from the two-dimensional image, processing of calculating a conversion function that is used so that the existing texture has a color closer to a color of the acquired texture, and processing of setting, for a texture unsetting region in the three-dimensional model, a texture calculated by applying the conversion function to the existing texture, the texture unsetting region being a region of which a texture is not obtained from the two-dimensional image.

Note that a series of processes described herein can be performed using hardware or software or a combination of them. When a process is performed using software, a program in which a processing sequence is recorded can be installed on a memory in a computer incorporated in dedicated hardware to be executed, or the program can be installed on a general-purpose computer capable of performing various processes to be executed. For example, the program can be recorded in a recording medium in advance. In addition to the program being installed on a computer from a recording medium, the program can be received through a network such as a local area network (LAN) or the Internet to be installed on a recording medium such as a built-in hard disk.

Further, the various processes described herein are not limited to being chronologically performed as described herein, and they may be performed in parallel or individually according to the capability of an apparatus that performs the processes, or as necessary. Further, a system herein is a logical collection of a plurality of apparatuses, and is not limited to having a configuration in which respective included apparatuses are situated in a single housing.

INDUSTRIAL APPLICABILITY

As described above, the configuration of the embodiment of the present disclosure provides an apparatus and a method that are used to generate a three-dimensional model in which a more natural texture is set for an occlusion region of which a texture is not obtained from a two-dimensional image.

Specifically, for example, a three-dimensional shape restoring section that generates a three-dimensional model on the basis of a two-dimensional image, and a texture processor that attaches a texture to the three-dimensional model are included. The texture processor acquires, from a DB, an existing texture similar to a texture acquired from the two-dimensional image, calculates a conversion function that is used so that the existing texture has a color closer to the color of the acquired texture, and sets, for a region of which a texture is not acquired from the two-dimensional image, a texture calculated by applying the conversion function to the existing texture. For example, a texture calculated by applying the conversion function is set for an occlusion region of which a texture is not obtained from a two-dimensional image.

This configuration provides an apparatus and a method that are used to generate a three-dimensional model in which a more natural texture is set for an occlusion region of which a texture is not obtained from a two-dimensional image.

REFERENCE SIGNS LIST 10 subject
20 image-capturing section
30 display section
100 image processing apparatus
111 input-data analysis and conversion section
112 object recognition section
113 three-dimensional shape restoring section
114 texture projection section
115 texture acquisition section
116 texture analyzer
117 texture-DB search section
118 color converter
119 signal processor
120 color combiner
121 three-dimensional-model output section
130 three-dimensional model database
140 texture database
201 RGB image
202 depth image
203 point cloud
211 existing three-dimensional model
220 restoration three-dimensional model
240 incomplete UV texture map corresponding to input image
241 acquired texture
250 similar existing UV texture map
251 similar existing texture
280 complete UV texture map corresponding to input image
300 image processing apparatus
301 controller
302 ROM
303 RAM
304 bus
305 input/output interface
306 input section
307 output section
308 storage
309 communication section
310 drive
311 removable medium

The invention claimed is:

1. An image processing apparatus, comprising:
circuitry configured to:
acquire an input two-dimensional image;
acquire a three-dimensional model corresponding to the input two-dimensional image;
acquire an input texture from the input two-dimensional image;
acquire, from a database, a similar texture that is similar to the input texture;
acquire a color-converted texture by converting a color of the similar texture to be closer to a color of the input texture;
apply the input texture to a non-occlusion region of the three-dimensional model; and
apply the color-converted texture to an occlusion region of the three-dimensional model.

2. The image processing apparatus according to claim 1, wherein
the database includes UV texture maps corresponding to the three-dimensional model, and
the circuitry is further configured to select, as the similar texture, one of the UV texture maps having a texture most similar to the input texture.

3. The image processing apparatus according to claim 1, wherein the circuitry is further configured to determine a region of the three-dimensional model designated by a user to acquire the similar texture corresponding the region.

4. The image processing apparatus according to claim 1, wherein the database includes UV texture maps and attribute information of the UV texture maps, and
the circuitry is further configured to search the similar texture on a basis of the attribute information.

5. The image processing apparatus according to claim 1, wherein
the input two-dimensional image includes a depth image, and
the circuitry is configured to acquire the three-dimensional model by:
acquiring, from the database, an existing three-dimensional model corresponding to the input two-dimensional image;
generating point cloud data based on the depth image on three-dimensional coordinates;
detecting a point of the point cloud data corresponding to a point of the existing three-dimensional model; and
deforming the existing three-dimensional model to reduce an error between the point of the point cloud data and the point of the existing three-dimensional model.

6. The image processing apparatus according to claim 1, wherein
the circuitry is further configured to apply, to the color-converted texture, at least one of resolution conversion processing, blurring processing, or sharpness processing.

7. An image processing method, comprising:
acquiring an input two-dimensional image;
acquiring a three-dimensional model corresponding to the input two-dimensional image;
acquiring an input texture from the input two-dimensional image;
acquiring, from a database, a similar texture that is similar to the input texture;
acquiring a color-converted texture by converting a color of the similar texture to be closer to a color of the input texture;
setting the input texture to a non-occlusion region of the three-dimensional model; and
setting the color-converted texture to an occlusion region of the three-dimensional model.

* * * * *